United States Patent [19]
Klemarczyk et al.

[11] Patent Number: 6,150,479
[45] Date of Patent: Nov. 21, 2000

[54] RADICAL-CURABLE ADHESIVE COMPOSITIONS, REACTION PRODUCTS OF WHICH DEMONSTRATE SUPERIOR RESISTANCE TO THERMAL DEGRADATION

[75] Inventors: Philip T. Klemarczyk, Collinsville; Maria L. Masterson, Cromwell, both of Conn.

[73] Assignee: Loctite Corporation, Rocky Hill, Conn.

[21] Appl. No.: 09/197,429

[22] Filed: Nov. 23, 1998

[51] Int. Cl.[7] .................................. C08F 4/06; C08F 4/52
[52] U.S. Cl. .............................. 526/90; 526/200
[58] Field of Search .................. 526/90, 200, 208, 526/227, 228, 236, 284, 333

[56] References Cited

U.S. PATENT DOCUMENTS

| | | | |
|---|---|---|---|
| 3,218,305 | 11/1965 | Krieble | 260/89.5 |
| 3,988,299 | 10/1976 | Malofsky | 260/47 |
| 4,180,640 | 12/1979 | Melody | 526/353.1 |
| 4,216,134 | 8/1980 | Brenner | 260/40 R |
| 4,273,851 | 6/1981 | Muzyczko | 430/175 |
| 4,287,330 | 9/1981 | Rich | 526/270 |
| 4,321,349 | 3/1982 | Rich | 526/270 |
| 4,387,204 | 6/1983 | Zahir | 526/249 |
| 4,439,600 | 3/1984 | Moran, Jr. | 528/392 |
| 4,468,524 | 8/1984 | Zahir | 560/221 |
| 4,540,829 | 9/1985 | Hefner, Jr. | 568/634 |
| 4,546,155 | 10/1985 | Hirose | 525/504 |
| 4,578,315 | 3/1986 | Santorelli | 428/414 |
| 5,084,490 | 1/1992 | McArdle | 522/181 |
| 5,166,290 | 11/1992 | Hayashi | 525/502 |
| 5,179,172 | 1/1993 | Chan | 525/328.9 |
| 5,270,362 | 12/1993 | Palmer | 524/81 |
| 5,326,827 | 7/1994 | Aoki | 525/337 |
| 5,369,200 | 11/1994 | Schädeli | 526/262 |
| 5,395,566 | 3/1995 | Kobayakawa | 252/586 |
| 5,468,886 | 11/1995 | Steinmann | 549/549 |
| 5,495,051 | 2/1996 | Wang | 568/633 |
| 5,599,651 | 2/1997 | Steinmann | 430/280.1 |
| 5,618,857 | 4/1997 | Newberth | 523/176 |
| 5,630,978 | 5/1997 | Domb | 264/330 |
| 5,656,703 | 8/1997 | Costin | 525/531 |

OTHER PUBLICATIONS

R.D. Rich, "Anaerobic Adhesives", *Handbook of Adhesive Technology*, 29, 467–79, A. Pizzi and K.L. Mittal, eds., Marcel Dekker. Inc. New York (1994).

J.G. Woods, "Radiation Curable Adhesives", *Radiation Curing: Science and Technology*, 333–98. S.P. Pappas, ed., Plenum Press, New York (1992).

L.J. Baccei and B.M. Malofsky, "Anaerobic Adhesives Containing Maleimides Having Improved Thermal Resistance", *Adhesive Chemicals*, 589–601, L–H Lee, ed., Plenum Publishing Corp. (1984).

*Primary Examiner*—Kriellion Sanders
*Attorney, Agent, or Firm*—Steven C. Bauman

[57] ABSTRACT

The present invention is directed to a radical-curable adhesive composition which includes a (meth)acrylate composition; a coreactant selected from unsaturated cyclic, bicyclic and tricyclic (meth)acrylates and epoxidized alkyl, cycloalkyl, bicyclic and tricyclic (meth)acrylates; and a radical cure-inducing composition. Reaction products of compositions in accordance with this invention exhibit superior resistance to thermal degradation.

22 Claims, 10 Drawing Sheets

RADICAL-CURABLE ADHESIVE COMPOSITIONS, REACTION PRODUCTS OF WHICH DEMONSTRATE SUPERIOR RESISTANCE TO THERMAL DEGRADATION

BACKGROUND OF THE INVENTION

1. Field of the Invention

The present invention is directed to radical-curable adhesive compositions which include a (meth)acrylate component; a coreactant selected from unsaturated cyclic, bicyclic and tricyclic (meth)acrylates and epoxidized alkyl, cycloalkyl, bicyclic and tricyclic (meth)acrylates; and a radical cure-inducing composition. Reaction products of the compositions of this invention exhibit superior resistance to thermal degradation.

2. Brief Description of the Technology

Radical-curable adhesive compositions generally are well-known. In the context of anaerobic adhesives, see e.g., R. D. Rich, "Anaerobic Adhesives" in *Handbook of Adhesive Technology*, 29, 467–79, A. Pizzi and K. L. Mittal, eds., Marcel Dekker, Inc., New York (1994) and references cited therein. In the context of radiation-curable adhesives, see e.g., J. G. Woods, "Radiation Curable Adhesives" in *Radiation Curing: Science and Technology*, 333–98, S. P. Pappas, ed., Plenum Press, New York (1992).

Uses of radical-curable adhesives are legion and new applications continue to be developed.

In the past, many adhesives particularly anaerobic adhesives, have been rendered resistant to degradation at elevated temperatures by the inclusion of certain additives.

For instance, U.S. Pat. No. 3,988,299 (Malofsky) refers to a heat curable composition having improved thermal properties, which includes certain acrylate monomers and maleimide compounds.

L. J. Baccei and B. M. Malofsky, "Anaerobic Adhesives Containing Maleimides Having Improved Thermal Resistance" in *Adhesive Chemicals*, 589–601, L-H, Lee, ed., Plenum Publishing Corp. (1984) report the use of maleimides—specifically, N-phenyl maleimide, m-phenylene dimaleimide and a reaction product of methylene dianiline and methylene dianiline bismaleimide—to increase the thermal resistance of anaerobic adhesives which are fully cured at temperatures of at least 150° C.

While the addition to radical-curable adhesive compositions of such maleimide compounds to render them resistant to thermal degradation provides reaction products with acceptable performance, it would be desirable to find alternative compounds to include in such formulations. Moreover, maleimides are known to inhibit photoinitated cure of acrylate-based compositions.

Compositions containing both epoxy resins and (meth)acrylate resins are known. For instance, U.S. Pat. No. 5,656,703 (Costin) refers to curable compositions, particularly well-suited for coating applications, containing an epoxy resin, a poly(meth)acrylate, a metal di(meth)acrylate as an adhesion promoter and a polyamine as a curing agent.

In addition, monomers containing both acrylate groups and epoxy groups are known generally.

For instance, U.S. Pat. Nos. 5,468,886 (Steinmann) and 5,599,651 (Steinmann) relate to radiation-sensitive (cyclo)aliphatic epoxy compounds containing both acrylate groups and (cyclo)aliphatic epoxy groups. These compounds are positioned as being useful in stereolithographic applications and useful as photocurable adhesives when a photoinitiator is added to the compounds.

U.S. Pat. No. 5,395,566 (Kobayakawa) refers to photochromic compositions containing, in addition to a photochromic compound, compounds having both radical-polymerizable groups and epoxy groups.

U.S. Pat. No. 5,326,827 (Aoki) refers to heat-curable resins comprising an acrylic polymer with epoxide and hydroxyl functionality, a polyfunctional epoxide compound, and a heat-latent cationic polymerization initiator.

And curing agents for epoxy-containing compounds are known, such as those commercially available from Ajinomoto Co., Tokyo, Japan under the tradename "AJICURE", for instance, "AJICURE" PN-23. See U.S. Pat. No. 4,546,155 (Hirose).

Notwithstanding the state-of-the-technology, there is an on-going search for additives to improve the thermal performance of reaction products of radical-curable adhesives. In addition, it would be desirable from a commercial, economic, environmental, supply and regulatory standpoint to provide alternatives and/or replacements for maleimide-type materials for improving the resistance to thermal degradation of reaction products of radical-curable adhesive compositions.

SUMMARY OF THE INVENTION

The present invention meets the desire discussed above by providing radical-curable adhesive compositions, reaction products of which exhibit superior performance at elevated temperatures. The compositions include a (meth)acrylate component; a coreactant; and a radical cure-inducing composition.

The coreactant may be selected from polymerizable materials within structure I represented as:

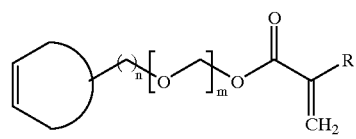

where

is a cyclic, bicyclic or tricyclic ring structure, which may be a carbocyclic or heterocyclic one, and may be chosen from substituted and unsubstituted five and six member cyclic rings, substituted and unsubstituted six, seven and eight member bicyclic rings, and substituted and unsubstituted nine, ten and eleven member tricyclic rings, R may be chosen from H or alkyl, such as methyl, ethyl, propyl or butyl, and n and m may be the same or different and are each integers chosen from 0 to 6.

Examples include cyclopentenyl, cyclohexenyl, 2.1.1-bicyclohexenyl, 2.2.1-bicycloheptenyl, and 3.0.1.2-tricyclodec-1-enyl, where n and m are 0 or 1, and R is H or methyl.

Also, the olefinic linkage within the cyclic, bicyclic or tricyclic ring structure is one that may be readily epoxidzied. For instance, epoxidized versions of polymerizable materials within structure I include the polymerizable materials within structure II represented as:

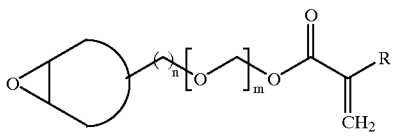

where

is a cyclic, bicyclic or tricyclic ring structure, which may be a carbocyclic or heterocyclic one, and may be chosen from substituted and unsubstituted five and six member cyclic rings, substituted and unsubstituted six, seven and eight member bicyclic rings, and substituted and unsubstituted nine, ten and eleven member tricyclic rings, R may be chosen from H or alkyl, such as methyl, ethyl, propyl or butyl, and n and m may be the same or different and are each integers chosen from 0 to 6.

Examples include cyclopentene oxide, cyclohexene oxide, 2.1.1-bicyclohexene oxide, 2.2.1-bicycloheptene oxide, and 3.0.1.2-tricyclodec-1-enyl, where n and m are 0 or 1, and R is H or methyl.

The coreactant may further be selected from polymerizable materials within structure III represented as:

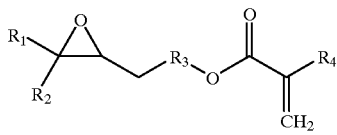

where $R_1$ may be chosen from H or alkyl, such as methyl, ethyl, propyl and the like;

$R_2$ may be chosen from H or alkyl, such as methyl, ethyl, propyl and the like; or $R_1$ and $R_2$, taken together, may form carbo- or hetero-cyclic, bicyclic or tricyclic ring structures having from five to eleven ring atoms;

$R_3$ may be chosen from linear or branched alkylene groups, with or without interruption by a hetero atom (e.g., O, N, S, and the like), such as methylene, ethylene, propylene, butylene, pentylene, hexylene and the like; and $R_4$ is H or alkyl, such as methyl, ethyl, propyl and the like.

In another aspect of this invention, thermal-resistance conferring agents may be included as well.

In yet another aspect of this invention, radiation-curable compositions are provided, reaction products of which demonstrate superior resistance to thermal degradation.

The invention also provides a process for preparing reaction products from the radical-curable adhesive compositions of the present invention, the steps of which include applying the composition to a desired substrate surface and exposing the coated substrate surface to conditions which are appropriate to effect cure thereof—e.g., exposure to conditions in which air is substantially excluded therefrom for anaerobic application or exposure to radiation in the electromagnetic spectrum for photoinitated applications.

In addition, the invention provides a process for preparing the radical-curable adhesive compositions of the present invention, the steps of which include combining with mixing the (meth)acrylate component, the coreactant, the thermal resistance-conferring agent (if any), and the radical cure-inducing composition.

Also, the invention provides the reaction products so-formed by the above-described process, which reaction products demonstrate superior thermal properties, such as resistance to degradation at elevated temperatures.

The present invention will be more fully appreciated by a reading of the section entitled, "Detailed Description of the Invention", together with the illustrative examples which follow thereafter and the figure.

DETAILED DESCRIPTION OF THE INVENTION

Figure 1:
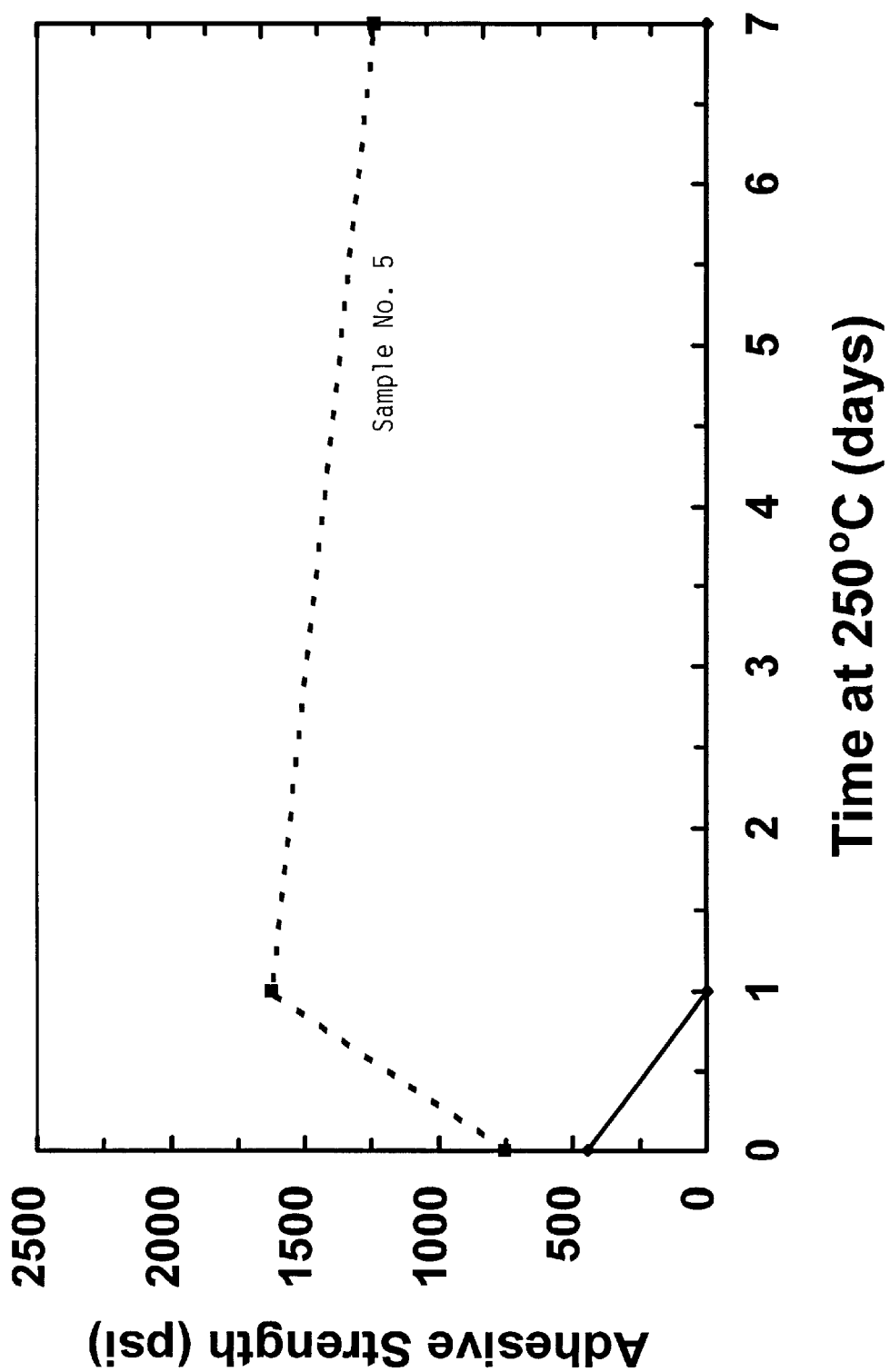
FIG. 1 depicts a plot of adhesive strength over time at a temperature of 250° C. for a reaction product of an anaerobic adhesive based on ETMPTA, with the coreactant ECTA, to enhance resistance to thermal degradation over its non-epoxidized counterpart—CTA.
Figure 2:
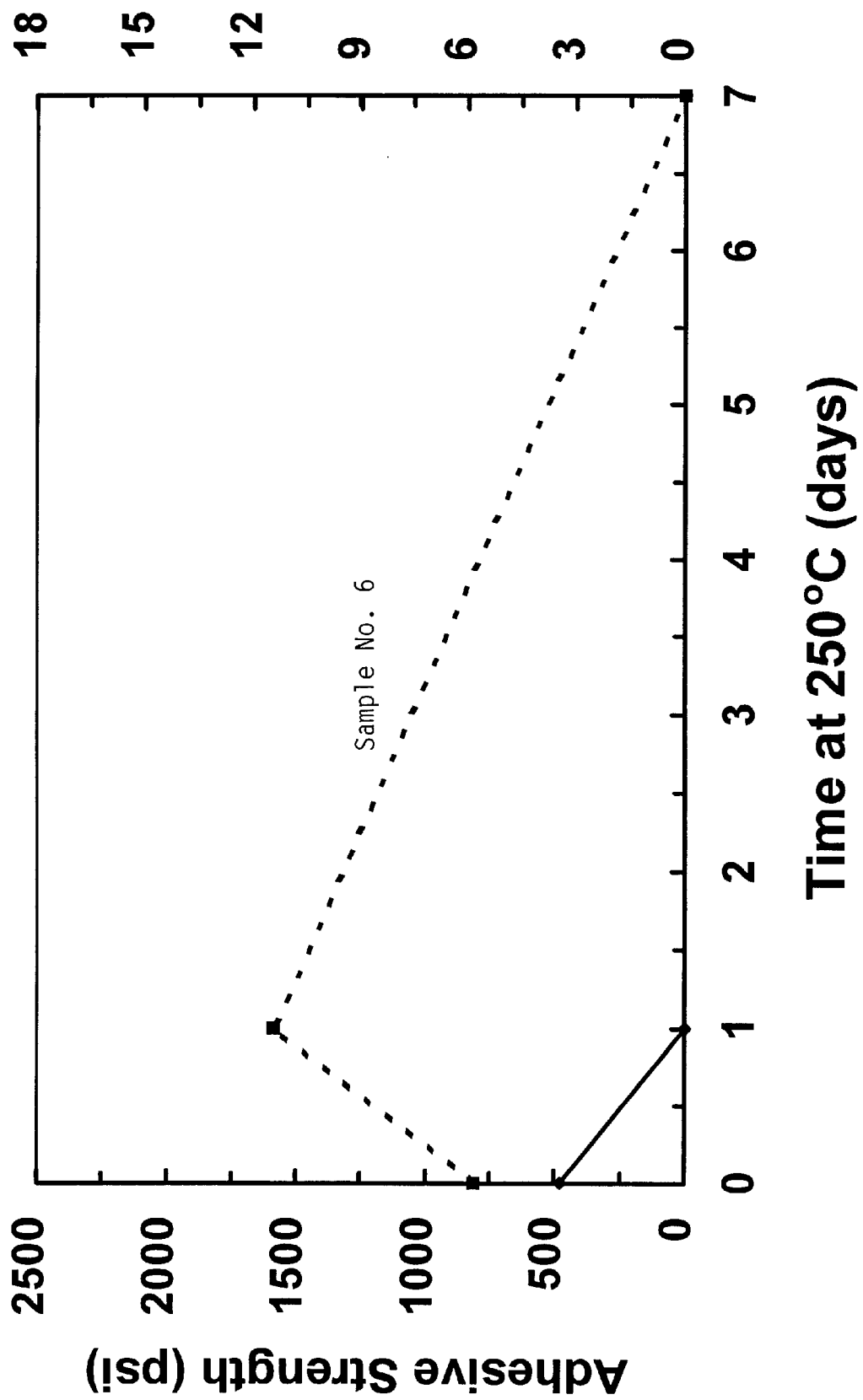
FIG. 2 depicts a plot of adhesive strength over time at a temperature of 250° C. for a reaction product of an anaerobic adhesive based on ETMPTA, with the coreactant ECTMA, to enhance resistance to thermal degradation over its non-epoxidized counterpart—CTMA.
Figure 3:
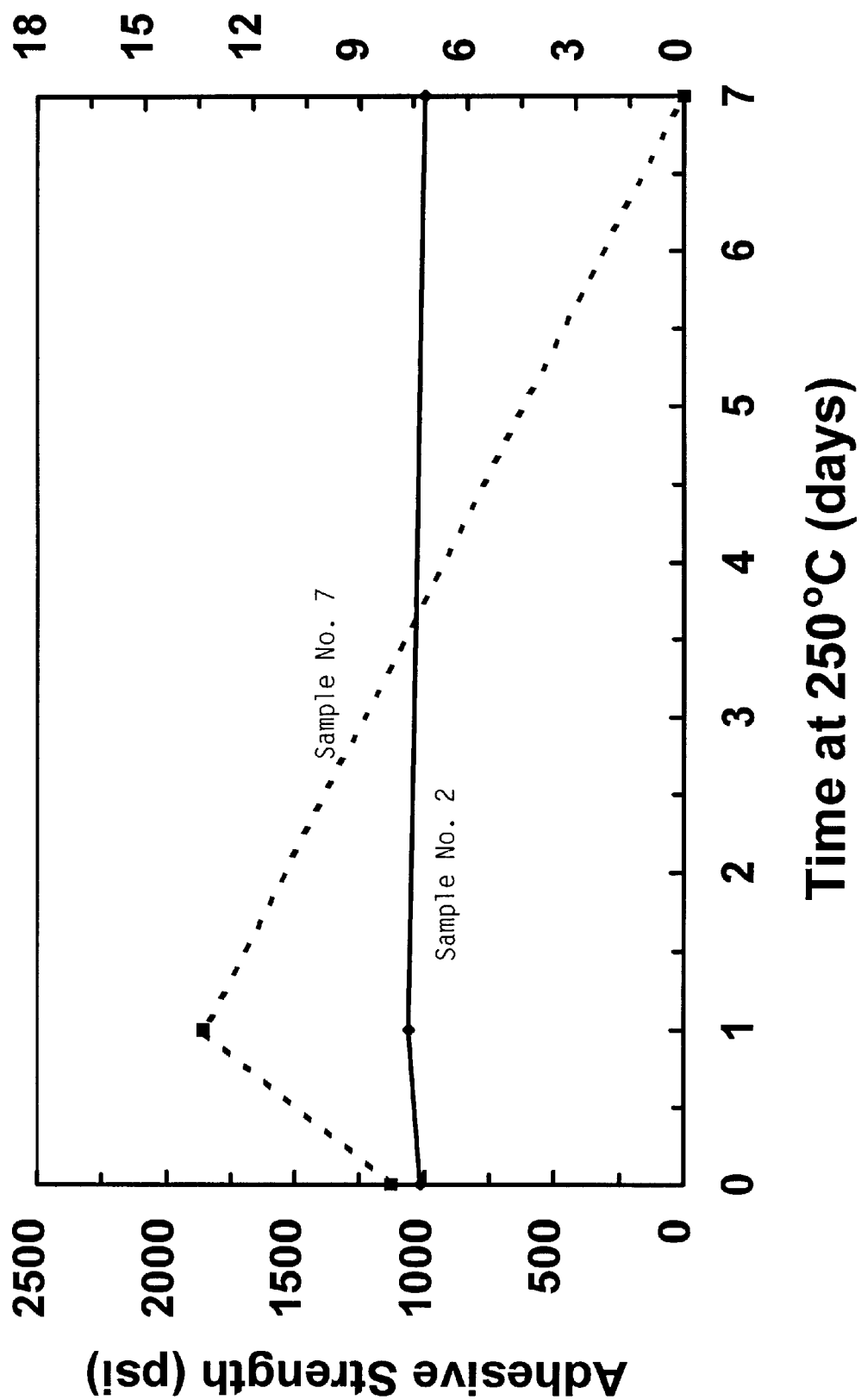
FIG. 3 depicts a plot of adhesive strength over time at a temperature of 250° C. for reaction products of two anaerobic adhesives based on ETMPTA, one with the coreactant CHA and the other with the coreactant ECHA.
Figure 4:
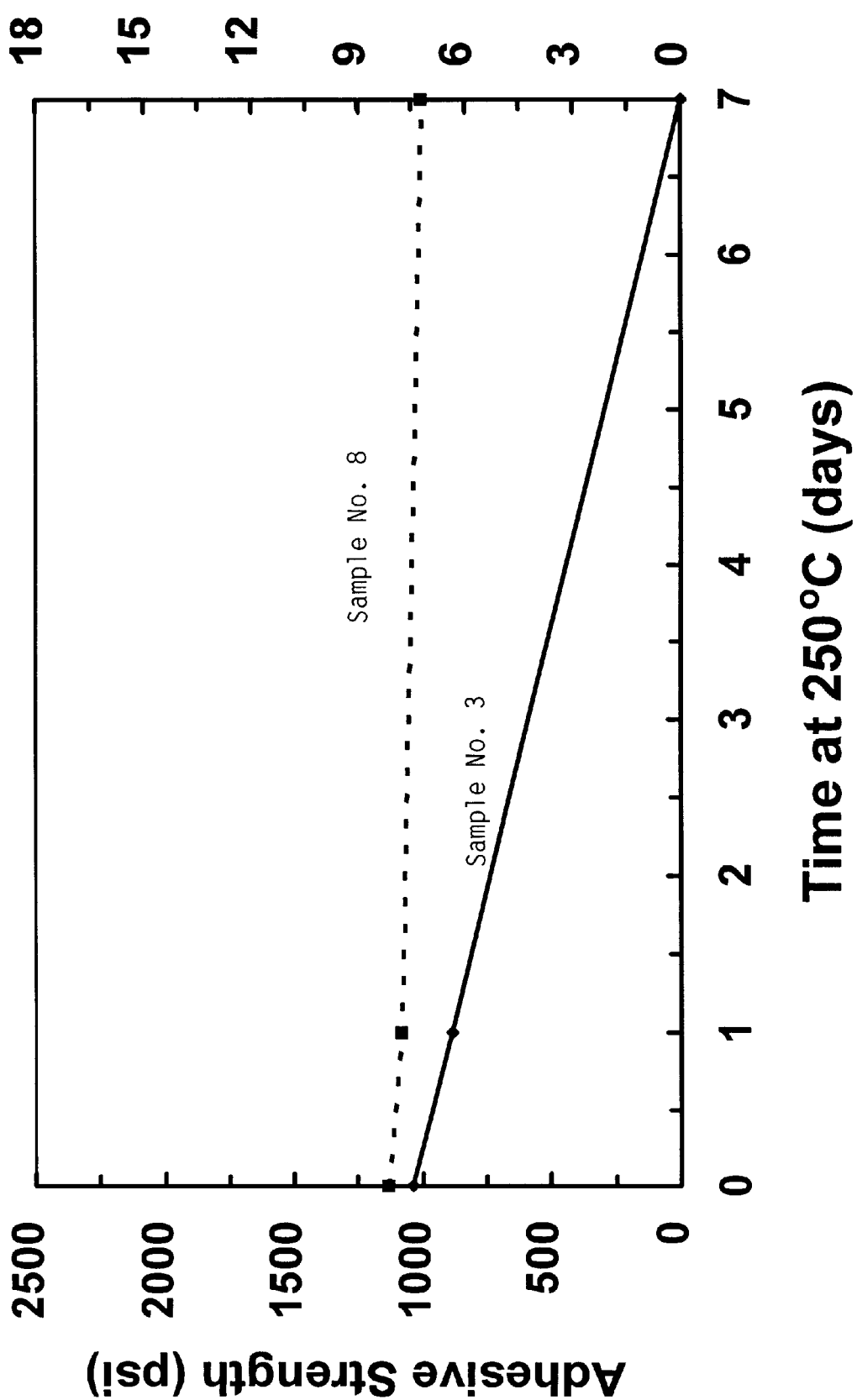
FIG. 4 depicts a plot of adhesive strength over time at a temperature of 250° C. for reaction products of an anaerobic adhesives based on ETMPTA, one with the coreactant CHMA, and the other with the coreactant CHMA.
Figure 5:
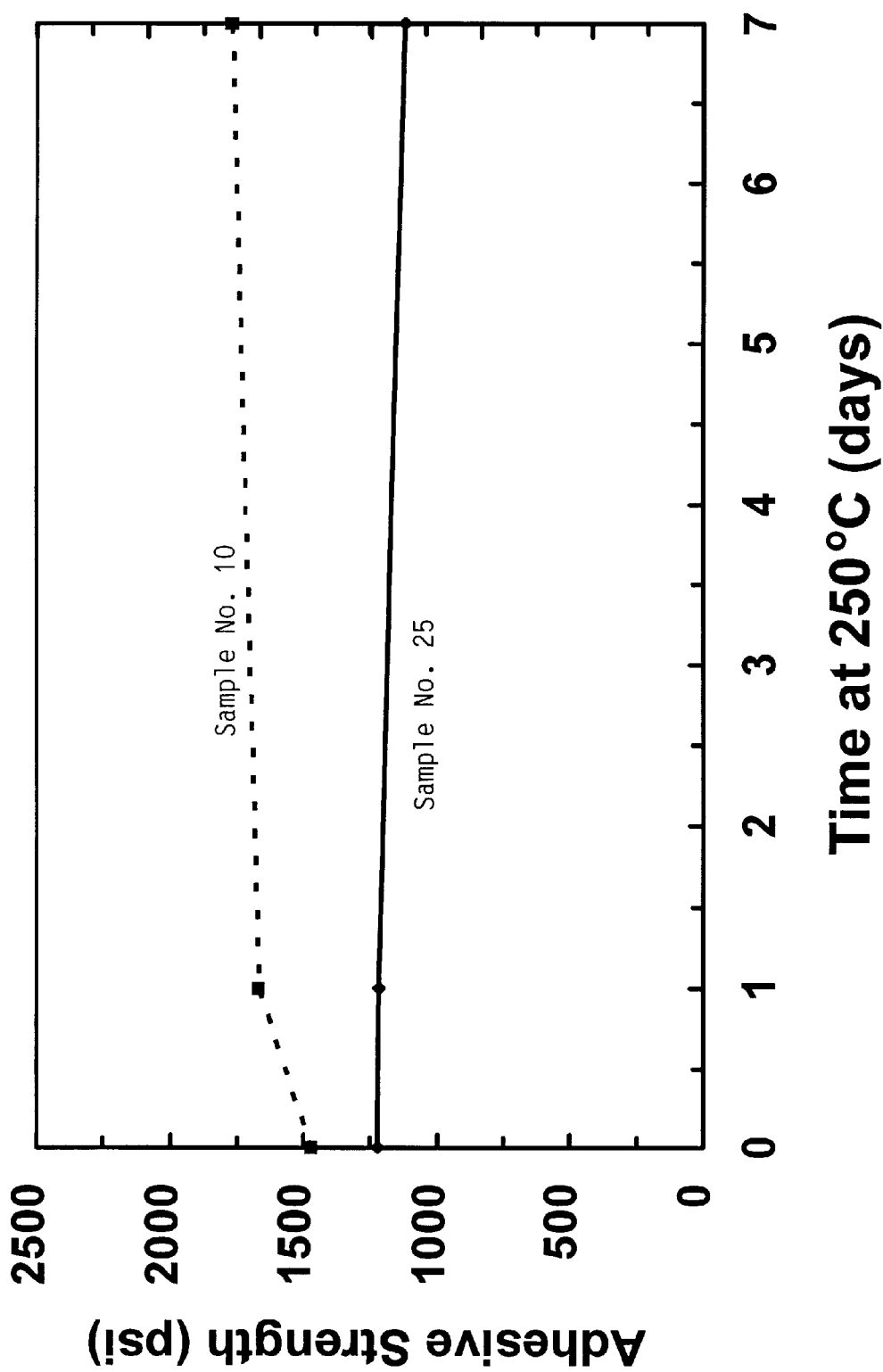
FIG. 5 depicts a plot of adhesive strength over time at a temperature of 250° C. for reaction products of an anaerobic adhesives based on ETMPTA, one with the coreactant QM-672, and the other with the coreactant EQM-672.
Figure 6:
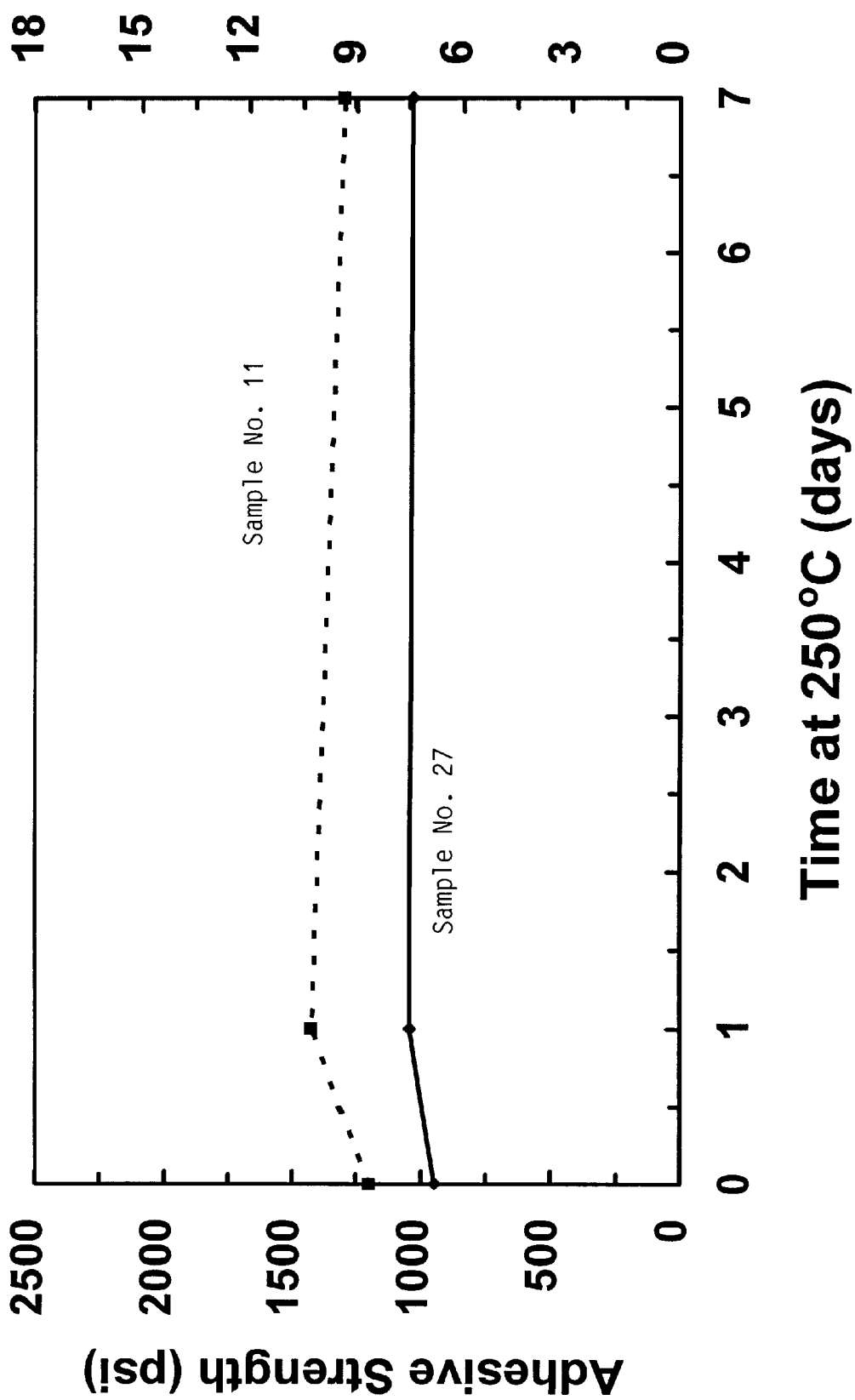
FIG. 6 depicts a plot of adhesive strength over time at a temperature of 250° C. for reaction products of an anaerobic adhesives based on QM-57, one with the coreactant QM-57, and the other with the coreactant EQM-57.

As noted above, the present invention is directed to radical-curable adhesive compositions which include a (meth)acrylate component; a coreactant as set forth herein; and a radical cure-inducing composition. Reaction products of the compositions of this invention exhibit superior performance, particularly under elevated temperature conditions.

The (meth)acrylate monomer suitable for use in the present invention may be chosen from a wide variety of materials represented by $H_2C\!\!=\!\!CGCO_2R^1$, where G may be hydrogen, halogen or alkyl of 1 to about 4 carbon atoms, and $R^1$ may be selected from alkyl, cycloalkyl, alkenyl, cycloalkenyl, alkaryl, aralkyl or aryl groups of 1 to about 16 carbon atoms, any of which may be optionally substituted or interrupted as the case may be with silane, silicon, oxygen, halogen, carbonyl, hydroxyl, ester, carboxylic acid, urea, urethane, carbamate, amine, amide, sulfur, sulonate, sulfone and the like.

More specific (meth)acrylate monomers particularly desirable for use herein include polyethylene glycol di(meth)acrylates, bisphenol-A di(meth)acrylates, such as ethoxylated bisphenol-A (meth)acrylate ("EBIPMA"), and tetrahydrofurane (meth)acrylates and di(meth)acrylates, citronellyl acrylate and citronellyl methacrylate, hydroxypropyl (meth)acrylate, hexanediol di(meth)acrylate, trimethylol propane tri(meth)acrylate, tetrahydrodicyclopentadienyl (meth)acrylate, ethoxylated trimethylol propane triacrylate ("ETMPTA"), triethylene glycol acrylate and triethylene glycol methacrylate ("TRIEGMA"), and an acrylate ester corresponding to structure IV as shown below:

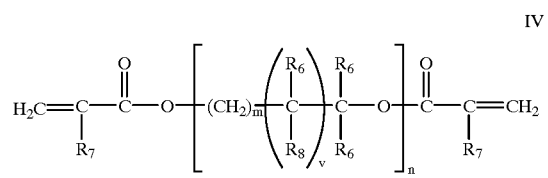

IV where $R_6$ may be selected from hydrogen, alkyl of 1 to about 4 carbon atoms, hydroxyalkyl of 1 to about 4 carbon atoms or

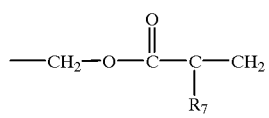

$R_7$ may be selected from hydrogen, halogen, and alkyl of 1 to about 4 carbon atoms;

$R_8$ may be selected from hydrogen, hydroxy and

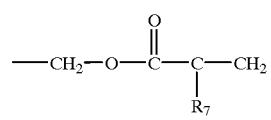

m is an integer equal to at least 1, e.g., from 1 to about 8 or higher, for instance, from 1 to about 4;

n is an integer equal to at least 1, e.g., 1 to about 20 or more; and v is 0 or 1.

Of course, combinations of these (meth)acrylate monomers may also be used.

The (meth)acrylate component should be present in the inventive compositions in an amount within the range of from about 10 to about 90, such as about 50 parts per hundred ("phr").

The coreactant may be selected from polymerizable materials within structure I represented as:

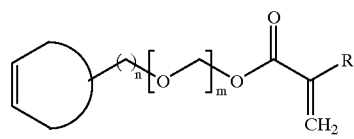

I where

is a cyclic, bicyclic or tricyclic ring structure, which may be a carbocyclic or heterocyclic one, and may be chosen from substituted and unsubstituted five and six member cyclic rings, substituted and unsubstituted six, seven and eight member bicyclic rings, and substituted and unsubstituted nine, ten and eleven member tricyclic rings, R may be chosen from H or alkyl, such as methyl, ethyl, propyl or butyl, and n and m may be the same or different and are each integers chosen from 0 to 6.

Examples include cyclopentenyl, cyclohexenyl, 2.1.1-bicyclohexenyl, 2.2.1-bicycloheptenyl, and 3.0.1.2-tricyclodec-1-enyl, where n and m are 0 or 1, and R is H or methyl.

Also, the olefinic linkage within the cyclic, bicyclic or tricyclic ring structure is one that may be readily epoxidzied. For instance, epoxidized versions of polymerizable materials within structure I include the polymerizable materials within structure II represented as:

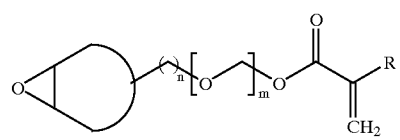

II where

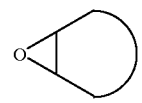

is a cyclic, bicyclic or tricyclic ring structure, which may be carbocyclic or heterocyclic and may be chosen from five and six member cyclic rings, substituted and unsubstituted six, seven and eight member bicyclic rings, and substituted and unsubstituted nine, ten and eleven member tricyclic rings, R may be chosen from H or alkyl, such as methyl, ethyl, propyl or butyl, and n and m may be the same or different each integer chosen from 0 to 6.

Examples include cyclopentene oxide, cyclohexene oxide, 2.1.1-bicyclohexene oxide, 2.2.1-bicycloheptene oxide, and 3.0.1.2-tricyclodec-1-enyl, where n and m are 0 or 1, and R is H or methyl.

The coreactant may further be selected from polymerizable materials within structure III represented as:

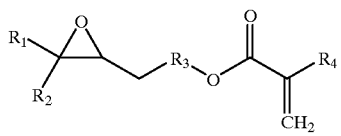

where
R$_1$ may be chosen from H or alkyl, such as methyl, ethyl, propyl and the like;

R$_2$ may be chosen from H or alkyl, such as methyl, ethyl, propyl and the like; or R$_1$ and R$_2$, taken together, may form carbo- or hetero-cyclic, bicyclic or tricyclic ring structures having from five to eleven ring atoms;

R$_3$ may be chosen from linear or branched alkylene groups, with or without interruption by a hetero atom (e.g., O, N, S, and the like), such as methylene, ethylene, propylene, butylene, pentylene, hexylene and the like; and R$_4$ is H or alkyl, such as methyl, ethyl, propyl and the like.

More specific examples of coreactants within structures I, II, and III include epoxidized citronellyl acrylate, epoxidized citronellyl methacrylate, cyclohexenyl methanol acrylate, cyclohexenyl methanol methacrylate, dihydrodicyclopentadienyl methacrylate, epoxidized cyclohexenyl methanol acrylate, epoxidized cyclohexenyl methanol methacrylate, epoxidized dihydrodicyclopentadienyl acrylate and epoxidized dihydrodicyclopentadienyl methacrylate.

In addition, epoxidized 2-propenoic acid, 2-[(3a,3,4,5,6,7,7a-hexahydro-4,7-methano-1H-indenyl)oxy]ethyl ester and epoxidized 2-propenoic acid, 2-methyl-, 2-[(3a,3,4,5,6,7,7a-hexahydro-4,7-methano-1H-indenyl)oxy]ethyl ester] may also be used as the coreactant.

The coreactant should be present in the inventive compositions in an amount within the range of about 10 phr to about 90 phr, such as 50 phr.

Radical cure-inducing compositions may be chosen from those which initiate cure through anaerobic mechanisms, photoinitiated (such as UV radiation and UV/VIS radiation) mechanisms, thermally-induced mechanisms and the like.

Anaerobic cure-inducing compositions useful in anaerobically-curable compositions in accordance with the present invention include a variety of components, such as amines (including amine oxides, sulfonamides and triazines). A desirable composition to induce cure in accordance with the present invention includes saccharin, toluidenes, such as N,N-diethyl-p-toluidene and N,N-dimethyl-o-toluidene, acetyl phenylhydrazine, and maleic acid. Of course, other materials known to induce anaerobic cure may also be included or substituted therefor. See e.g., U.S. Pat. No. 3,218,305 (Krieble), U.S. Pat. No. 4,180,640 (Melody), U.S. Pat. No. 4,287,330 (Rich) and U.S. Pat. No. 4,321,349 (Rich). Quinones, such as napthoquinone and anthraquinone, may also be included to scavenge free radicals which form.

Photoinitiated cure-inducing compositions may be chosen from a variety of materials, such as those commercially available from Ciba Specialty Chemicals Corp., Tarrytown, N.Y. under the tradename "IRGACURE" and "DAROCUR", such as "IRGACURE" 184 (1-hydroxycyclohexyl phenyl ketone), 907 (2-methyl-1-[4-(methylthio)phenyl]-2-morpholino propan-1-one), 369 [2-benzyl-2-N,N-dimethylamino-1-(4-morpholinophenyl)-1-butanone], 500 (the combination of 1-hydroxy cyclohexyl phenyl ketone and benzophenone), 651 (2,2-dimethoxy-2-phenyl acetophenone), 1700 [the combination of bis(2,6-dimethoxybenzoyl-2,4-,4-trimethyl pentyl)phosphine oxide and 2-hydroxy-2-methyl-1-phenyl-propan-1-one] and "DAROCUR" 1173 (2-hydroxy-2-methyl-1-phenyl-1-propane) and 4265 (the combination of 2,4,6-trimethylbenzoyldiphenyl-phosphine oxide and 2-hydroxy 2-methyl-1-phenyl-propan-1-one); photoinitiators available commercially from Union Carbide Chemicals and Plastics Co. Inc., Danbury, Conn. under the "CYRACURE" tradename, such as "CYRACURE" UVI-6974 (mixed triaryl sulfonium hexafluoroantimonate salts) and UVI-6990 (mixed triaryl sulfonium hexafluorophosphate salts); and the visible light [blue] photoinitiators, dl-camphorquinone and "IRGACURE" 784DC.

Additional photoinitiated cure-inducing compositions may be chosen from those available from Sartomer, Inc., Exton, Pa. under the tradenames "ESACURE" and "SARCAT". Examples include "ESACURE" KB1 (benzil dimethyl ketal), "ESACURE" EB3 (mixture of benzoin and butyl ethers), "ESACURE" TZT (trimethylbenzophenone blend), "ESACURE" KIP100F (α-hydroxy ketone), "ESACURE" KIP150 (polymeric hydroxy ketone), "ESACURE" KT37 (blend of "ESACURE" TZT and KIP150), "ESACURE" KT046 (blend of triphenyl phosphine oxide, "ESACURE" KIP150 and TZT), "ESACURE" X33 (blend of 2- and 4-isopropylthioxanthone, ethyl 4-(dimethyl amino) benzoate and "ESACURE" TZT], "SARCAT" CD 1010 [triaryl sulfonium hexafluoroantimonate (50% in propylene carbonate)], "SARCAT" DC 1011 [triaryl sulfonium hexafluorophosphate (50% n-propylene carbonate)], "SARCAT" DC 1012 (diaryl iodonium hexafluoroantimonate), and "SARCAT" K185 [triaryl sulfonium hexafluorophosphate (50% in propylene carbonate)].

Of course, combinations of such photoinitiated cure-inducing compositions may be used as deemed appropriate by those of ordinary skill in the art.

Thermally-activated latent curing compositions may be chosen from those available commercially from E.I. duPont and de Nemeurs, Wilmington, Del. under the tradenames "LUPERSOL", "DELANOX-F", "ALPEROX-F", "LUCIDOL", "LUPERCO", and "LUPEROX".

Examples include "LUPERSOL" DDM-9 (mixtures of peroxides and hydroperoxides), "LUPERSOL" DDM-30 (mixtures of peroxides and hydroperoxides), "LUPERSOL" DELTA-X-9 (mixtures of peroxides and hydroperoxides), "LUPERSOL" DHD-9 (mixtures of peroxides and hydroperoxides), "LUPERSOL" DFR (mixtures of peroxides and hydroperoxides), "LUPERSOL" DSW-9 (mixtures of peroxides and hydroperoxides), "LUPERSOL" 224 (2,4-pentanedione peroxide), "LUPERSOL" 221 [di(n-propyl) peroxydicarbonate], "LUPERSOL" 225 [di(s-butyl) peroxydicarbonate], "LUPERSOL" 225-M75 [di(s-butyl) peroxydicarbonate], "LUPERSOL" 225-M60 [di(s-butyl) peroxydicarbonate], "LUPERSOL" 223 [di(2-ethylhexyl) peroxydicarbonate], "LUPERSOL" 223-M75 [di(2-ethylhexyl)peroxydicarbonate], "LUPERSOL" 223-M40 [di (2-ethylhexyl)peroxydicarbonate], "LUPERSOL" 219-M60 (diisononanoyl peroxide), "LUCIDOL" 98 (benzoyl peroxide), "LUCIDOL" 78 (benzoyl peroxide), "LUCIDOL" 70 (benzoyl peroxide), "LUPERCO" AFR-400 (benzoyl peroxide), "LUPERCO" AFR-250 (benzoyl peroxide), "LUPERCO" AFR-500 (benzoyl peroxide), "LUPERCO" ANS (benzoyl peroxide), "LUPERCO" ANS-P (benzoyl peroxide), "LUPERCO" ATC (benzoyl peroxide), "LUPERCO" AST (benzoyl peroxide), "LUPERCO" AA (benzoyl peroxide), "LUPERCO" ACP (benzoyl peroxide), "LUPERSOL" 188M75 (α-cumylperoxy neodecanoate), "LUPERSOL" 688T50 (1,1-dimethyl-3-hydroxy-butyl peroxyneoheptanoate), "LUPERSOL" 688M50 (1,1-dimethyl-3-hydroxy-butyl peroxyneoheptanoate), "LUPERSOL" 288M75 (α-cumyl peroxyneoheptanoate), "LUPERSOL" 546M75 (t-amylperoxy neodecanoate), "LUPERSOL" 10 (t-butylperoxy neodecanoate), "LUPERSOL" 10M75 (t-butylperoxy neodecanoate), "LUPERSOL" 554M50 (t-amylperoxypivalate), "LUPERSOL" 554M75 (t-amylperoxypivalate), "LUPERSOL" 11 (t-butylperoxypivalate), "LUPERSOL" 665T50 (1-1-dimethyl-3-hydroxy-butylperoxy-2-ethylhexanoate), "LUPERSOL" 665M50 (1-1-dimethyl-3-hydroxy-butylperoxy-2-ethylhexanoate), "LUPERSOL" 256 [2,5-dimethyl-2,5-di(2-ethylhexanoyl peroxy) hexane], "LUPERSOL" 575 (t-amylperoxy-2-ethyl-hexanoate), "LUPERSOL" 575P75 (t-amylperoxy-2-ethyl-hexanoate), "LUPERSOL" 575M75 (t-amylperoxy-2-ethyl-hexanoate), t-butyl peroctoate (t-butylperoxy-2-ethylhexanoate), "LUPERSOL" PMS (t-butylperoxy-2-ethylhexanoate), "LUPERSOL" PDO (t-butylperoxy-2-ethylhexanoate), "LUPERSOL" 80 (t-butyl peroxyisobutyrate), "LUPERSOL" PMA (t-butyl peroxymaleic acid), "LUPERCO" PMA-25 (t-butyl peroxymaleic acid), "LUPERSOL" 70 (t-butyl peroxyacetate), "LUPERSOL" 75-M (t-butyl peroxyacetate), LUPERSOL" 76-M (t-butyl peroxyacetate), "LUPERSOL" 555M60 (t-amyl peroxy-acetate), "LUPERSOL" KDB (di-t-butyl diperoxyphthalate), "LUPERSOL" TBIC-M75 (OO-t-butyl-O-isopropyl monoperoxycarbonate), "LUPEROX" 118 [2,5-dimethyl-2,5-di(benzoylperoxy)hexane], "LUPERSOL" TBEC [OO-t-butyl-O-(2-ethylhexyl) monoperoxycarbonate], "LUPERSOL" TAEC [OO-t-amyl-O-(2-ethylhexyl) monoperoxycarbonate], "LUPEROX" 500R (dicumyl peroxide), "LUPEROX" 500T (dicumyl peroxide), "LUPERCO" 500-40C (dicumyl peroxide), "LUPERCO" 500-40E (dicumyl peroxide), "LUPERCO" 500-SRK (dicumyl peroxide), "LUPERSOL" 101 [2,5-dimethyl-2,5-di-(t-butylperoxy)hexane], "LUPERSOL" 101-XL [2,5-dimethyl-2,5-di-(t-butylperoxy)hexane], "LUPERCO" 101-P20 [2,5-dimethyl-2,5-di-(t-butylperoxy)hexane], "LUPERSOL" 801 (t-butyl cumyl peroxide), "LUPERCO" 801-XL (t-butyl cumyl peroxide), "LUPEROX" 802 [αα-bis(t-butylperoxy)diisopropylbenzene], "LUPERCO" 802-40KE [αα-bis(t-butylperoxy)diisopropylbenzene], "LUPERSOL" 130 [2,5-dimethyl-2,5-di-(t-butylperoxy)hexyne-3], "LUPERCO" 130-XL [2,5-dimethyl-2,5-di-(t-butylperoxy)hexyne-3], "LUPEROX" 2,5-2,5 (2,5-dihydroperoxy-2,5-dimethylhexane), "LUPERSOL" 230 [n-butyl-4,4-di-(t-butylperoxy)valerate], "LUPERCO" 230-XL [n-butyl-4,4-di-(t-butylperoxy)valerate], "LUPERSOL" 231 [1,1-di(t-butylperoxy)-3,3,5-trimethyl cyclohexane], "LUPERCO" 231-XL [1,1-di(t-butylperoxy) 3,3,5-trimethyl cyclohexane], "LUPERSOL" 231-P75 [1,1-di(t-butylperoxy) 3,3,5-trimethyl cyclohexane], "LUPERCO" 231-SRL [1,1-di(t-butylperoxy)-3,3,5-trimethyl cyclohexane], "LUPERSOL" 331-80B [1,1-di(t-butylperoxy)cyclohexane], "LUPERCO" 331-XL [1,1-di(t-butylperoxy)cyclohexane], "LUPERSOL" 531-80B [1,1-di (t-amylperoxy)cyclohexane], "LUPERSOL" 531-80M [1,1-di(t-amylperoxy)cyclohexane], "LUPERSOL" 220-D50 [2,2-di(t-butylperoxy)butane], "LUPERSOL" 233-M75 [ethyl-3,3-di(t-butylperoxy)butyrate], "LUPERCO" 233-XL [ethyl-3,3-di(t-butylperoxy)butyrate], "LUPERSOL" P-31 [2,2-di-(t-amylperoxy)propane], "LUPERSOL" P-33 [2,2-di-(t-amylperoxy)propane], and "LUPERSOL" 553-M75 [ethyl 3,3-di(t-amylperoxy)butyrate].

Other thermally-activated latent curing compositions include those available commercially from DuPont under the "VAZO" tradename, such as "VAZO" 64 (azobisisobutyrile nitrile), "VAZO" 67 (butane nitrile, 2-methyl, 2,2'-azobis) and "VAZO" 88 (cyclohexane carbonitrile, 1,1'-azobis).

The radical cure-inducing composition should be present generally within the range of from about 0.001 phr to about 10 phr, such as from about 1 phr to about 5 phr.

It may be desirable to include thermal resistance-conferring agents to the inventive compositions to further enhance the resistance to thermal degradation of reaction products thereof at elevated temperatures.

Examples of these thermal resistance-conferring agents include latent imidizoles, and imidizole derivatives, more specifically methyl imidizole, benzoyl imidizole, benzoyl methylimidizole, phthaloyldiimidizole and those adducts disclosed in U.S. Pat. No. 4,546,155 (Hirose), the disclosure of which is hereby expressly incorporated herein by reference. For instance, the adducts disclosed in the '155 patent are obtained by reacting a compound having an active hydrogen together with a tertiary amino group in the molecule (such as imidizole or derivative thereof), an epoxy compound and a carboxylic acid anhydride.

Of course, combinations of these thermal resistance-conferring agents are also desirable.

Where an anaerobically curable composition is at hand, the inventive composition may also include other components common to conventional anaerobic adhesive formulation, such as free-radical initiators, free-radical accelerators, inhibitors of free-radical generation, as well as metal catalysts.

A number of well-known initiators of free-radical polymerization may be incorporated into compositions of the present invention including, without limitation, hydroperoxides, such as cumene hydroperoxide ("CHP"), para-menthane hydroperoxide, t-butyl hydroperoxide ("TBH") and t-butyl perbenzoate.

Such peroxide compounds may be employed in the present invention in the range of from about 0.1 phr to about 10 phr, with about 0.5 phr to about 5 phr being desirable.

Stabilizers and inhibitors (such as phenols including hydroquinone and quinones) may also be employed to control and prevent premature peroxide decomposition and polymerization of the composition of the present invention, as well as chelating agents [such as diethylenetriamine pentaacetic acid ("DTPA") or the tetrasodium salt of ethylenediamine tetraacetic acid ("EDTA")] to remove trace amounts of metal contaminants therefrom.

Accelerators may be employed to enhance the rate of cure propagation, such as in amounts in the range of about 0.1 phr to about 5 phr, desirably about 1 phr to about 3 phr. When the accelerator is in the form of a metal catalyst solution or a pre-mix, it may be used in an amount in the range of about 0.03 phr to about 0.1 phr. Other agents such as thickeners, plasticizers, fillers, and other well-known additives may be incorporated in the inventive composition where the art-skilled person believes it would be desirable to do so.

The compositions of the present invention may be prepared using conventional methods which are well known to those persons of skill in the art. For instance, the components of the inventive compositions may be combined together with mixing in any convenient order consistent with the roles and functions the components are to perform in the compositions. Conventional mixing techniques using known apparatus may be employed.

The compositions of this invention may be applied to a variety of substrates, such as steel, brass, aluminum, zinc and other metals and alloys. In addition, in the context of anaerobic adhesives, synthetic or composite substrates may be used, provided an appropriate primer or activator composition is first applied thereon, if necessary.

The compositions of this invention may also be used to impregnate the pores of substrates constructed from such materials. See e.g., U.S. Pat. No. 5,618,857, the disclosure of which is hereby expressly incorporated herein by reference.

The following examples are provided to further illustrate the present invention. Many other practical opportunities exist with respect to the teaching herein, which will become readily apparent to those persons of skill in the art upon a review of the examples.

EXAMPLES

I. Synthetic Procedures

A. Procedure for Preparing Coreactant (Meth)acrylate Esters

The starting materials were charged to a three neck reaction flask, equipped with a mechanical stirrer, thermometer, Dean-Stark trap, condenser, and nitrogen inlet, under nitrogen. The reaction mixture was heated to reflux. The reaction was allowed to continue for a period of time such that the evolution of water ceased (typically, about 3 hours). The solution was condensed to about half its volume under reduced pressure. The organic layer was washed twice with saturation aqueous $Na_2CO_3$, twice with saturation aqueous sodium chloride, and twice with water. The organic layer was separated, dried over anhydrous $MgSO_4$, and filtered. Solvent was removed under reduced pressure, and the product was vacuum distilled.

1. Cyclohexenyl Methanol Acrylate ("CHA")

CHA was prepared by the above procedure from cyclohexenyl methanol (100 gram, 0.89 mole), acrylic acid (57.6 grams, 0.8 mole), p-toluenesulfonic acid (4 grams, 21 mmole), MEHQ (2 grams, 5.7 mmole), and toluene (500 ml) in a 1 liter reaction flask. The aqueous washes were performed with 400 ml portions each. The CHA was obtained in an amount of 96.5 grams (73% yield). The CHA was determined to have a boiling point in the range of 68–69° C. at a reduced pressure of 0.35 Torr.

$^1$H NMR and IR spectroscopy confirmed the identity of CHA: $^1$H NMR ($CDCl_3$) δ6.4 (d, 1, =CH), 6.1 (dd, 1, COCH=), 5.8 (d, 1, =CH), 5.7 (br s, 2, =CH), 4.1 (d, 2, $OCH_2$), 2.1 (m, 4, $CH_2$), 1.8 (m, 2, $CH_2$), 1.3 (m, 1, CH); IR (neat) 2915, 1724, 1625, 1187 $cm^{-1}$.

2. Cyclohexenyl Methanol Methacrylate ("CHMA")

CHMA was prepared by the above procedure from cyclohexenyl methanol (200 grams, 1.79 mole), methacrylic acid (137.6 grams, 1.60 mole), p-toluenesulfonic acid (15.2 grams, 80 mmole), MEHQ (8 grams, 5.7 mmole), and toluene (1000 ml) in a 2 liter reaction flask. The aqueous washes were performed with 400 ml portions for each wash. The CHMA was obtained in an amount of 225.9 grams (78% yield). The CHMA was determined to have a boiling point in the range of 64–66° C. at a reduced pressure of 0.3 Torr.

$^1$H NMR and IR spectroscopy confirmed the identity of CHMA: $^1$H NMR ($CDCl_3$) δ6.1 (s, 1, =CH), 5.7 (br s, 2, =CH), 5.6 (s, 1, =CH), 4.1 (d, 2, $OCH_2$), 2.1 (m, 4, $CH_2$), 2.0 (s, 3, $CH_3$), 1.8 (m, 2, $CH_2$), 1.4 (m, 1, CH; IR (neat) 2915, 1728, 1643, 1165 $cm^{-1}$.

3. Dihydrodicyclopentadienyl Methacrylate ("DHCMA")

DHCMA was prepared by the above procedure from dihydrodicyclopentadienol (100 grams, 0.67 mole), methacrylic acid (51.3 grams, 0.6 mole), p-toluenesulfonic acid (5.7 grams, 30 mmole), MEHQ (4 grams, 2.8 mmole), and toluene (500 ml) in a 1 liter reaction flask. The aqueous washes were performed with 500 ml portions for each wash.

The DHCMA was obtained in an amount of 94.2 grams (73% yield). The DHCMA was determined to have a boiling point in the range of 78–83° C. at a reduced pressure of 0.3 Torr.

$^1$H NMR and IR spectroscopy confirmed the identity of DHCMA: $^1$H NMR ($CDCl_3$) δ6.1 (s, 1, =CH), 5.7 (br s, 2, =CH), 5.5 (s, 1, =CH), 5.5 (s, 1, =CH), 4.7 (m, 1, OCH), 2.6 (m, 2, $CH_2$), 1.3–2.2 (m, 6, CH, $CH_2$), 1.9 (s, 3, $CH_3$); IR (neat) 2958, 1716, 1637, 1166 $cm^{-1}$.

B. Procedure for Preparing Coreactant Epoxide/(Meth) acrylate Esters

To a three neck reaction flask, equipped with a mechanical stirrer, thermometer, and condenser, was added the unsaturated monomer and methylene chloride. m-Chloroperoxybenzoic acid ("m-CPBA") (60%) was added slowly to the solution as a solid. The temperature of the reaction mixture was maintained below about 30° C. and allowed to stir overnight at ambient temperature. m-Chlorobenzoic acid precipitated and was filtered. The organic layer was washed twice with saturated aqueous $NaHCO_3$, twice with 10% aqueous $Na_2SO_3$, and twice with water. The organic layer was separated, dried over anhydrous MgSO4, and filtered.

To the solution was added 2% by weight of MEHQ, based on the weight of the expected product, and solvent was removed under reduced pressure. In certain cases, the product was purified by distillation under high vacuum, while in others, the epoxy/(meth)acrylate monomer polymerized on heating, even with a large amount of MEHQ present. The so-prepared monomers were used without further purification where distillation was not practical.

1. Epoxidized Citronellyl Acrylate ("ECTA")

ECTA was prepared by the above reaction from citronellyl acrylate ("CTA") (104 grams, 0.49 mole), 60% m-CPBA (157 grams, 0.54 mole), and $CH_2Cl_2$ (1000 ml) in a 2 liter reaction flask.

CTA was prepared by the procedure set forth in Example I.A. from citronellol (200 grams, 1.28 mole), acrylic acid (81.1 grams, 1.126 mole), p-toluenesulfonic acid (10.7 grams, 56 mmole), methyl ethyl hydroquinone ("MEHQ") (8 grams, 5.7 mmole), and toluene (1000 ml) in a 2 liter reaction flask.

The aqueous washes were performed with 400 ml portions for each wash. The CTA was obtained in an amount of 210 grams (87% yield). The CTA was determined to have a boiling point in the range of 72–75° C. at a reduced pressure of 0.4 Torr.

$^1$H NMR and IR spectroscopy confirmed the identity of CTA: $^1$H NMR ($CDCl_3$) δ6.4 (d, 1, =CH), 6.1 (dd, 1, COCH=), 5.8 (d, 1, =CH), 5.1 (t, 1, =CH), 4.2 (t, 2, $OCH_2$), 1.2–2.1 (m, 7, CH, $CH_2$), 1.7 (s, 3, $CH_3$), 1.6 (s, 3, $CH_3$), 0.9 (d, 3, $CH_3$); IR (neat) 2926, 1720, 1638, 1453, 1166 $cm^{-1}$. The aqueous washes were performed with 500 ml portions for each wash. The product was determined to have a boiling point in the range of 101–103° C. at a reduced pressure of 0.5 Torr. The ECTA was obtained in an amount of 77.5 grams (69% yield).

$^1$H NMR and IR spectroscopy confirmed the identity of ECTA: $^1$H NMR ($CDCl_3$) δ6.4 (d, 1, =CH), 6.1 (dd, 1, COCH=), 5.8 (d, 1, =CH), 4.1 (m, 2, $CH_2$), 2.7 (t, 1, COCH), 2.0 (s, 3, $CH_3$), 1.1–1.8 (m, 5, CH, $CH_2$), 1.3 (s, 3, $CH_3$), 1.2 (s, 3, $CH_3$), 0.9 (d, 3, $H_3$); IR (neat) 2961, 1719, 1636, 1408, 1195 $cm^{-1}$.

2. Epoxidized Citronellyl Methacrylate ("ECTMA")

ECTMA was prepared by the above reaction from citronellyl methacrylate ("CTMA") (100 grams, 0.40 mole), 60% m-CPBA (125.5 grams, 0.435 mole), and $CH_2Cl_2$ (1000 ml) in a 2 liter reaction flask.

CTMA was prepared by the procedure set forth in Example I.A. from citronellol (200 grams, 1.28 mole), methacrylic acid (96.9 grams, 1.13 mole), p-toluenesulfonic acid (10.7 grams, 56 mmole), MEHQ (8 grams, 5.7 mmole), and toluene (1000 ml) in a 2 liter reaction flask.

The aqueous washes were performed with 400 ml portions for each wash. The CTMA was obtained in an amount of 211 grams (83% yield). The CTMA was determined to have a boiling point in the range of 73–78° C. at a reduced pressure of 0.25 Torr.

$^1$H NMR and IR spectroscopy confirmed the identity of CTMA: $^1$H NMR (CDCl$_3$) d 6.1 (s, 1, =CH), 5.6 (s, 1, =CH), 5.1 (t, 1, C=CHC), 4.1 (t, 2, OCH$_2$), 1.1–2.1 (m, 7, CH, CH$_2$), 1.7 (s, 3, CH$_3$), 1.6 (s, 3, CH$_3$), 0.9 (d, 3, CH$_3$); IR (neat) 2926, 1721, 1638, 1166 cm$^{-1}$. The aqueous washes were performed with 500 ml portions for each wash. The product was determined to have a boiling point of 99–100° C. at a reduced pressure of 0.5 Torr. The ECTMA was obtained in an amount of 60.5 grams (57% yield).

$^1$H NMR and IR spectroscopy confirmed the identity of ECTMA: $^1$H NMR (CDCl$_3$) δ6.4 6.1 (s, 1, COCH=), 5.6 (s, 1, =CH), 4.1 (m, 2, CH$_2$), 2.7 (t, 1, C$\underline{O}$CH), 2.0 (s, 3, CH$_3$), 1.0–1.8 (m, 5, CH, CH$_2$), 1.3 (s, 3, CH$_3$), 1.2 (s, 3, CH$_3$), 0.9 (d, 3, CH$_3$); IR (neat) 2959, 1719, 1637, 1167 cm$^{-1}$.

3. Epoxidized Cyclohexenyl Methanol Acrylate ("ECHA")

ECHA was prepared by the above reaction from CHA (200 grams, 1.2 mole), 60% m-CPBA (377.7 grams, 1.31 mole), and CH$_2$Cl$_2$ (2000 ml) in a 3 liter reaction flask. The aqueous washes were performed with 500 ml portions for each wash. The product was determined to have a boiling point of 91–92° C. at a reduced pressure of 0.8 Torr. The ECHA was obtained in an amount of 122 grams (56% yield).

$^1$H NMR and IR spectroscopy confirmed the identity of ECHA: $^1$H NMR (CDCl$_3$) δ6.4 (d, 1, =CH), 6.1 (dd, 1, COCH=), 5.8 (d, 1, =CH), 4.0 (m, 2, OCH$_2$), 3.1 (t, 2, C$\underline{O}$CH), 1.0–2.3 (m, 7, CH$_2$); IR (neat) 2933, 1723, 1626, 1189 cm$^{-1}$.

4. Epoxidized Cyclohexenyl Methanol Methacrylate ("ECHMA")

ECHMA was prepared by the above reaction from CHMA (100 grams, 0.56 mole), 60% m-CPBA (175.9 grams, 0.610 mole), and CH$_2$Cl$_2$ (1000 ml) in a 2 liter reaction flask. The aqueous washes were performed with 500 ml portions for each wash. The product was determined to have a boiling point of 94–97° C. at a reduced pressure of 0.5 Torr. The ECHMA was obtained in an amount of 80.8 grams (75% yield).

$^1$H NMR and IR spectroscopy confirmed the identity of ECHMA: $^1$H NMR (CDCl$_3$) δ6.1 (s, 1, =CH), 5.6 (s, 1, =CH) , 4.0 (m, 2, OCH), 3.1 (t, 2, C$\underline{O}$CH), 1.0–2.2 (m, 7, CH, CH$_2$), 1.9 (s, 3, CH$_3$); IR (neat) 2910, 1718, 1637, 1168 cm$^{-1}$.

5. Epoxidized QM-672 ("EOM-672")

EQM-672 was prepared by the above reaction from QM-672 [2-propenoic acid, 2-[(3a,3,4,5,6,7,7a-hexahydro-4,7-methano-1H-indenyl)oxy]ethyl ester, commercially available from Rohm and Haas Co., Philadelphia, Pa.] (200 grams, 0.81 mole), 60% m-CPBA (253 grams, 0.88 mole), and CH$_2$Cl$_2$ (2000 ml) in a 2 liter reaction flask. The aqueous washes were performed with 500 ml portions for each wash. The solvent was evaporated, providing EQM-672 in an amount of 202 grams (95% yield).

$^1$H NMR and IR spectroscopy confirmed the identity of EQM-672: $^1$H NMR (CDCl$_3$) δ6.4 (d, 1, =CH), 6.1 (dd, 1, C$\underline{O}$CH=), 5.8 (d, 1, =CH), 4.3 (t, 2, OCH$_2$), 3.6 (t, 2, C $\underline{O}$CH), 3.2–3.8 (m, 3, OCH, OCH$_2$), 1.2–2.5 (m, 10, CH,CH$_2$); IR (neat) 2952, 1725, 1636, 1406, 1194 cm$^{-1}$.

6. Epoxidized QM-57 ("EQM-57")

EQM-57 was prepared by the above reaction from QM-57 [2-propenoic acid, 2-methyl-, 2-[(3a,3,4,5,6,7,7a-hexahydro-4,7-methano-1H-indenyl)oxy]ethyl ester, commercially available from Rohm and Haas Co., Philadelphia, Pa.] (100 grams, 0.38 mole), 60% m-CPBA (120 grams, 0.41 mole), and CH$_2$Cl$_2$ (1000 ml) in a 2 liter reaction flask. The aqueous washes were performed with 500 ml portions for each wash. The solvent was evaporated, providing EQM-57 in the amount of 103.6 grams (97.6% yield).

$^1$H NMR and IR spectroscopy confirmed the identity of EQM-57: $^1$H NMR (CDCl$_3$) δ6.2 (s, 1, =CH), 5.6 (s, 1, =CH), 4.2 (m, 2, OCH$_2$), 3.6 (t, 2, C$\underline{O}$CH), 3.2–3.8 (m, 3, OCH, OCH$_2$), 1.2–2.5 (m, 10, CH, CH$_2$), 1.9 (s, 3, CH$_3$); IR (neat) 2955, 1719, 1643, 1169 cm$^{-1}$.

7. Epoxidized Dihydrodicyclopentadienyl Methacrylate ("EDHCMA")

EDHCMA was prepared by the above reaction from DHCMA (50 grams, 229 mmole), 60% m-CPBA (72.7 grams, 252 mmole), and CH$_2$Cl$_2$ (500 ml) in a 1 liter reaction flask. The aqueous washes were performed with 500 ml portions of water for each wash. The solvent was evaporated, providing EDHCMA in an amount of 53 grams (99% yield).

$^1$H NMR and IR spectroscopy confirmed the identity of EDHCMA: $^1$H NMR (CDCl$_3$) δ6.2 (s, 1, =CH), 5.5 (s, 1, =CH), 4.7 (m, 1, OCH), 3.5 (s, 1, COCH), 3.3 (t, 1, C$\underline{O}$CH), 1.2–2.4 (m, 10, CH, CH$_2$), 1.9 (s, 3, CH$_3$); IR (neat) 2958, 1715, 1636, 1168 cm$^{-1}$.

C. Procedure for the Preparation of Benzoyl Imidazoles

To a one liter three neck reaction flask, equipped with a mechanical stirrer, condenser, thermometer, addition funnel, and nitrogen inlet, was added the imidazole and 400 ml of toluene under nitrogen. The mixture was stirred until the imidazole dissolved and 25 grams of Na$_2$CO$_3$ was added. Benzoyl chloride was dissolved in 100 ml of toluene and added dropwise over 5 minutes to the reaction mixture. After the addition was complete, an additional 25 grams of Na$_2$CO$_3$ was added and the reaction mixture was heated to reflux. The reaction was heated overnight, and then allowed to cool to room temperature. The organic layer was washed three times with 500 mls of water, dried over anhydrous MgSO$_4$, and filtered. Solvent was then removed under reduced pressure and the product was dried under high vacuum. The product was used without further purification because of the high purity indicated by $^1$H NMR analyses.

1. Benzoyl Imidazole ("BI")

Benzoyl imidazole was prepared by the above procedure using benzoyl chloride (28.1 grams, 200 mmole) and imidazole (14.3 grams, 210 mmole), in an amount of 24.3 grams (71% yield).

$^1$H NMR and IR spectroscopy confirmed the identity of benzoyl imidizole: $^1$H NMR (CDCl$_3$) δ8.1 (s, 1, N=CH—N), 7.4–8.0 (m, 5, ArH), 7.6 (s, 1, =CH), 7.2 (s, 1, =CH); IR (neat) 3127, 1709, 1371 cm$^{-1}$.

2. Benzoyl Methylimidazole ("BMI")

Benzoyl imidazole was prepared by the above procedure using benzoyl chloride (28.1 grams, 200 mmole) and 2-methylimidazole (16.4 grams, 210 mmole), in an amount of 22.4 grams (60% yield).

$^1$H NMR and IR spectroscopy confirmed the identity of benzoyl methylimidizole: $^1$H NMR (CDCl$_3$) δ7.5–7.9 (m, 5, ArH), 7.1 (s, 1, =CH), 6.9 (s, 1, =CH), 2.7 (s, 1, CH$_3$),; IR (neat) 3116, 1705, 1317 cm$^{-1}$.

3. Phthaloyl Diimidazole ("PDI")

To a one liter three neck reaction flask, equipped with a mechanical stirrer, condenser, thermometer, addition funnel, and nitrogen inlet, was added imidazole (14.3 grams, 210 mmole) and 400 ml of toluene under nitrogen. The mixture was stirred until the imidazole dissolved and 25 grams of $Na_2CO_3$ was added. Phthaloyl chloride (20.2 grams, 100 mmole) was dissolved in 100 ml of toluene and added dropwise over 5 minutes to the reaction mixture. After the addition was complete, an additional 25 grams of $Na_2CO_3$ was added and the reaction mixture was heated to reflux. The reaction was heated overnight and then cooled to room temperature. The product precipitated as a light yellow solid. To the reaction flask was added 400 ml of water to dissolve any inorganic salts. The mixture was stirred for an additional 10 minutes. The product was filtered, washed twice with 400 mls of water, and then dried overnight at ambient temperature under high vacuum. The phthaloyl diimidizole was obtained in an amount of 11.5 grams (43% yield), and used without further purification.

$^1$H NMR and IR spectroscopy confirmed the identity of phthaloyl diimidizole: $^1$H NMR (CDCl$_3$) δ8.2 (s, 1, N=CH—N), 8.0 (s, 4, ArH), 7.6 (s, 1, =CH), 7.2 (s, 1, =CH); IR (KBr) 3130, 1710, 1371 cm$^1$.

II. Preparation of Radical-Curable Adhesive Compositions

We prepared radical-curable adhesive compositions using the components and amounts indicated below in Table 1. Sample Nos. 1–12 were rendered anaerobically curable through the addition of about 4.5 phr of an anaerobic cure-inducing composition. The composition included about 1.7 phr of saccharin, about 1.34 phr of N,N-dimethyl-p-toluidene, and about 1.63 phr of cumene hydroperoxide. For comparative purposes, one composition (Sample No. 1) contained no coreactant and one (Sample No. 14) contained a maleimide instead of any coreactant.

TABLE 1

| Sample No. | ETMPTA (phr) | Coreactant (50 phr) | Maleimide (17 phr) |
|---|---|---|---|
| 1 | 100 | — | — |
| 2 | 50 | CHA | — |
| 3 | 50 | CHMA | — |
| 4 | 50 | DHCMA | — |
| 5 | 50 | ECTA | — |
| 6 | 50 | ECTMA | — |
| 7 | 50 | ECHA | — |
| 8 | 50 | ECHMA | — |
| 9 | 50 | EDHCMA | — |
| 10 | 50 | EQM-672 | — |
| 11 | 50 | EQM-57 | — |
| 12 | 50 | — | HVA-2 |

Initially, the compositions were prepared by adding with mechanical mixing at room temperature the ETPMA as the (meth)acrylate component (and as appropriate 50 phr of the coreactant or 17 phr of the maleimide) to 50 ml beakers, and thereafter adding the appropriate amounts of the components of the desired anaerobic cure-inducing composition (save cumene hydroperoxide).

The components were mixed for an appropriate period of time to allow for dissolution of all of the solid components. Cumene hydroperoxide was then added portionwise, with mixing continued for an additional period of time of about 0.5 hours.

The so-formed formulations were stored for further use by covering the beaker ensuring that an air pocket remained between the surface of the formulation and the cover.

Additional samples (Nos. 13–32) were formulated in accordance with this invention to include in addition to the (meth)acrylate component and coreactant, a thermal-resistance conferring agent such as an imidizole derivative [or, latent imidizole (e.g., MI, BI, BMI, PDI and "AJI-CURE" PN-23]. More specifically, the thermal resistance-conferring agent used was "AJICURE" PN-23, the (meth) acrylate component was ETMPA and the coreactant was chosen from those recited below in Table 2. These compositions also included about 1.7 phr of saccharin, about 1.34 phr of N,N-dimethyl-p-toluidene, and about 1.63 phr of cumene hydroperoxide. For comparative purposes, samples were prepared with and without the "AJICURE" PN-23. These samples were prepared as described above, with the "AJICURE" PN-23 included at a level of about 10 phr as the last component, when present.

TABLE 2

| Sample No. | (Meth) acrylate Component (50 phr) | Coreactant (50 phr) | Thermal-Resistance Conferring Agent |
|---|---|---|---|
| 13 | ETMPTA | CHA | — |
| 14 | ETMPTA | CHA | PN-23 |
| 15 | ETMPTA | CHMA | — |
| 16 | ETMPTA | CHMA | PN-23 |
| 17 | ETMPTA | ECTA | — |
| 16 | ETMPTA | ECTA | PN-23 |
| 19 | ETMPTA | ECTMA | — |
| 20 | ETMPTA | ECTMA | PN-23 |
| 21 | ETMPTA | ECHA | — |
| 22 | ETMPTA | ECHA | PN-23 |
| 23 | ETMPTA | ECHMA | — |
| 24 | ETMPTA | ECHMA | PN-23 |
| 25 | ETMPTA | QM-672 | — |
| 26 | ETMPTA | QM-672 | PN-23 |
| 27 | ETMPTA | QM-57 | — |
| 28 | ETMPTA | QM-57 | PN-23 |
| 29 | ETMPTA | EQM-672 | — |
| 30 | ETMPTA | EQM-672 | PN-23 |
| 31 | ETMPTA | EQM-57 | — |
| 32 | ETMPTA | EQM-57 | PN-23 |

Figure 7:
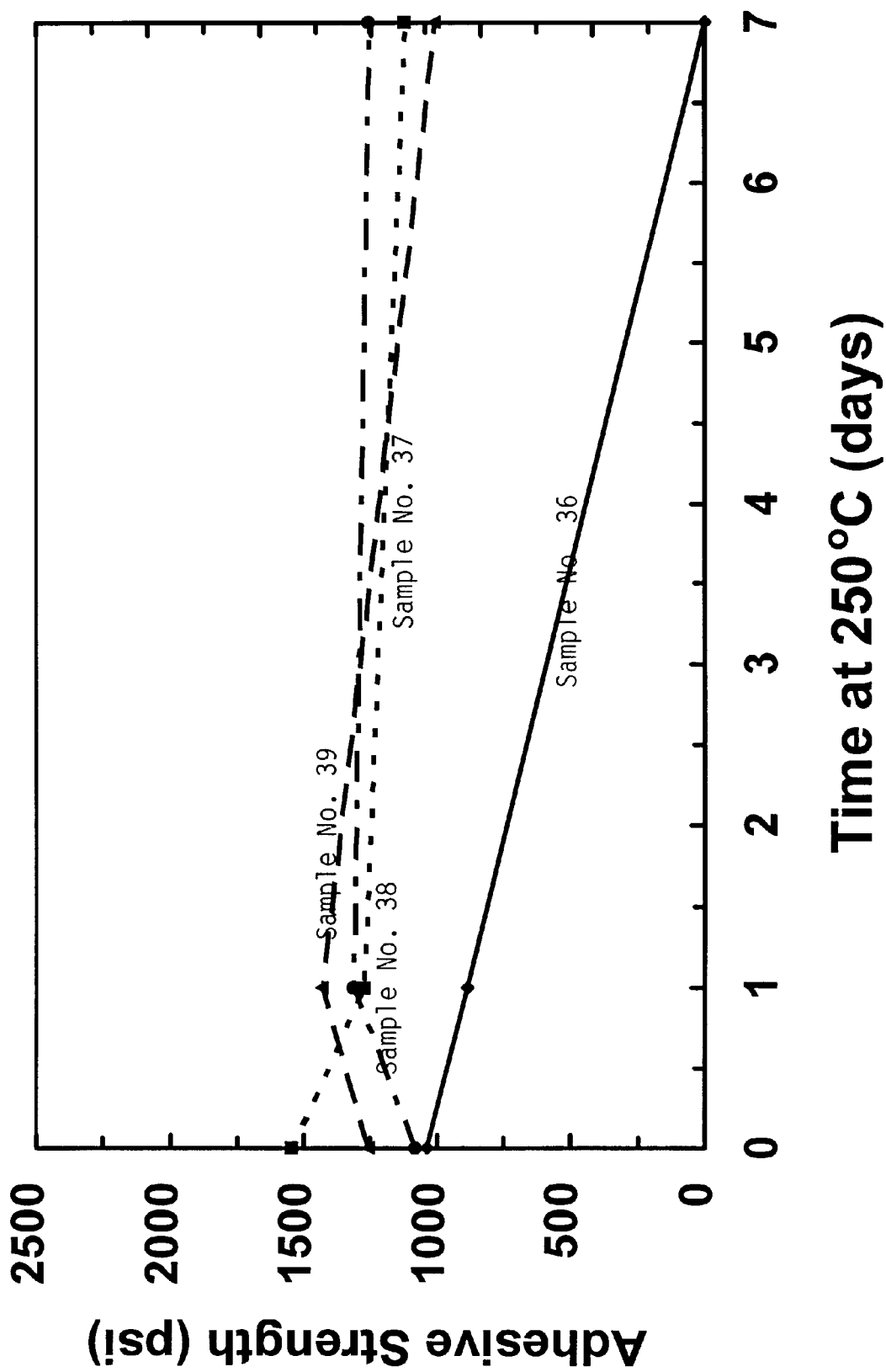
FIG. 7 depicts a plot of adhesive strength over time at a temperature of 250° C. for reaction products of anaerobic adhesives based on CHMA, both with and without "AJI-CURE" PN-23 at various levels as a thermal resistance-conferring agent.
Figure 8:
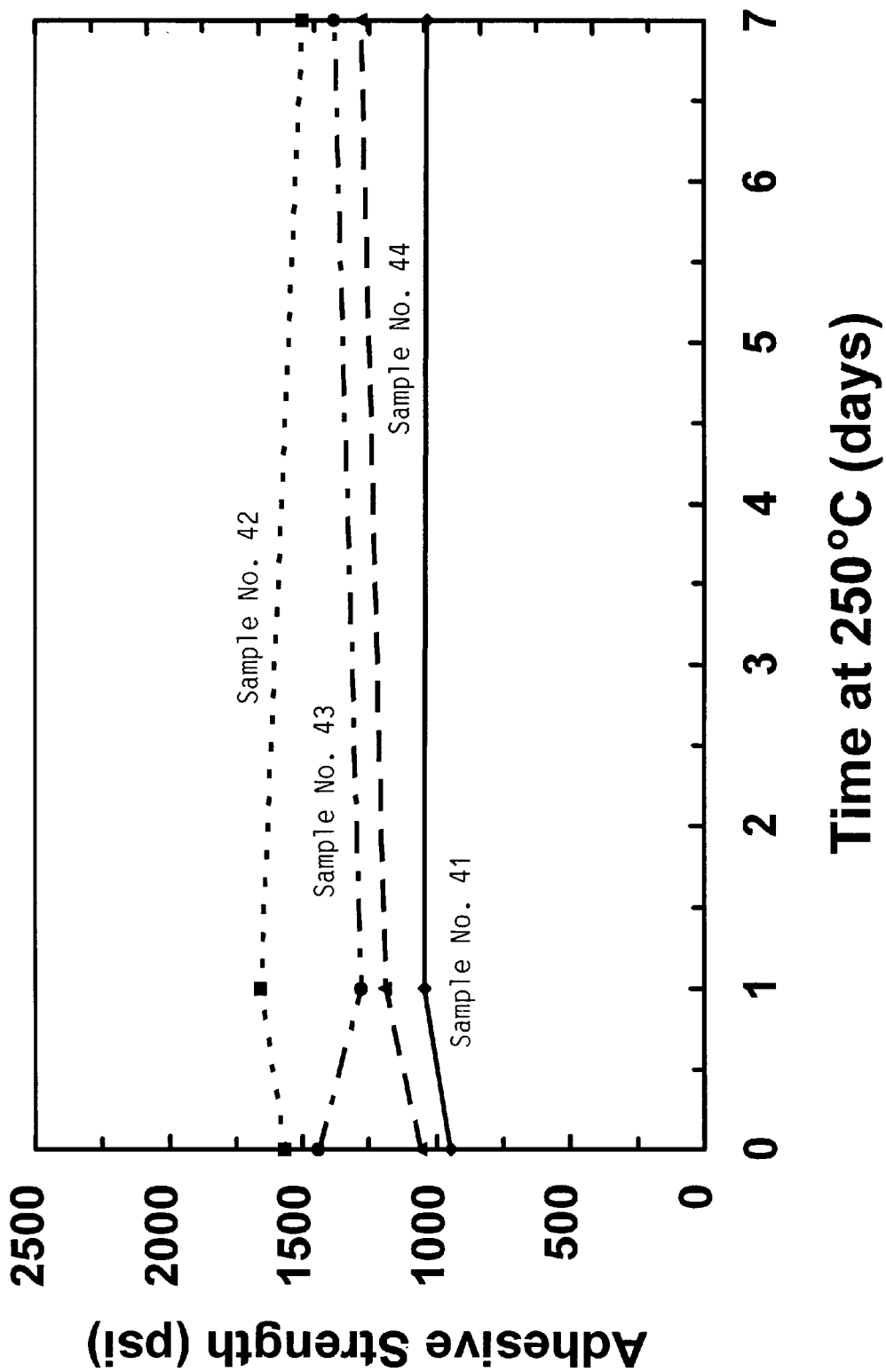
FIG. 8 depicts a plot of adhesive strength over time at a temperature of 250° C. for reaction products of anaerobic adhesives based on QM-57, both with and without "AJI-CURE" PN-23 at various levels as a thermal resistance-conferring agent.

As regards Sample Nos. 15 and 16, and 27 and 28, we also evaluated the affect of "AJICURE" PN-23 at different levels (5 phr and 20 phr) on the anaerobic adhesive formulations. See Sample Nos. 36–39 and 41–44 below in Table 3, and FIGS. 7 and 8.

TABLE 3

| Sample No. | (Meth)acrylate Type | Amt (phr) | Coreactant Type | Amt (phr) | Thermal Resistance Conferring Agent Type | Amt (phr) | Maleimide (17 phr) |
|---|---|---|---|---|---|---|---|
| 33 | TRIEGMA | 100 | — | — | — | — | — |
| 34 | TRIEGMA | 100 | — | — | PN-23 | 10 | — |

TABLE 3-continued

| Sample No. | (Meth)acrylate Type | Amt (phr) | Coreactant Type | Amt (phr) | Thermal Resistance Conferring Agent Type | Amt (phr) | Maleimide (17 phr) |
|---|---|---|---|---|---|---|---|
| 35 | TRIEGMA | 100 | — | — | PN-23 | 20 | — |
| 36 | ETMPTA | 50 | CHMA | 50 | — | — | — |
| 37 | ETMPTA | 50 | CHMA | 50 | PN-23 | 5 | — |
| 38 | ETMPTA | 50 | CHMA | 50 | PN-23 | 10 | — |
| 39 | ETMPTA | 50 | CHMA | 50 | PN-23 | 20 | — |
| 40 | TRIEGMA | 50 | CHMA | 50 | — | — | HVA-2 |
| 41 | ETMPTA | 50 | QM-57 | 50 | — | — | — |
| 42 | ETMPTA | 50 | QM-57 | 50 | PN-23 | 5 | — |
| 43 | ETMPTA | 50 | QM-57 | 50 | PN-23 | 10 | — |
| 44 | ETMPTA | 50 | QM-57 | 50 | PN-23 | 20 | — |

III. Application of Radical-Curable Adhesive Compositions To Desired Substrate, and Cure Thereof Certain of the compositions were applied to grit-blasted mild steel lap shears assembled with a one-half inch overlap. The lap shears were clamped together and allowed to cure at room temperature for a period of time of about 24 hours. After the cure time, the lap shear assemblies were evaluated for strength and thermal performance.

IV. Elevated Temperature Performance of Cured Adhesive Compositions

Five sets of the lap shear assemblies were evaluated for adhesive strength after the initial cure, and then after a period of time of about 1 day and 7 days at elevated temperature conditions of about 250° C. The evaluation was performed in accordance with test method, ASTM D-1002, where the assemblies were evaluated for adhesive strength at room temperature. The room temperature strength data for these samples are set forth below in Tables 4a, 4b and 4c.

TABLE 4a

| Sample No. | Lapshear Adh. Str. (psi) [@ 250° C. over time (days)] | | |
|---|---|---|---|
| | initial | 1 | 7 |
| 2 | 1,013 | 1,062 | 1,000 |
| 3 | 1,041 | 887 | 0 |
| 5 | 755 | 1,625 | 1,239 |
| 6 | 815 | 1,585 | 0 |
| 7 | 1,131 | 1,859 | 0 |
| 8 | 1,133 | 1,083 | 1,006 |
| 10 | 1,201 | 1,429 | 1,299 |
| 11 | 1,471 | 1,668 | 1,771 |

TABLE 4b

| Sample No. | Lapshear Adh. Str. (psi) [@ 250° C. over time (days)] | | |
|---|---|---|---|
| | initial | 1 | 7 |
| 13 | 1,013 | 1,062 | 1,00 |
| 14 | 1,073 | 1,489 | 1,322 |
| 15 | 1,041 | 887 | 0 |
| 16 | 1,258 | 1,431 | 1,012 |
| 17 | 754 | 1,625 | 1,239 |
| 18 | 711 | 2,044 | 1,180 |
| 19 | 815 | 1,585 | 0 |
| 20 | 812 | 1,380 | 0 |
| 21 | 1,131 | 1,345 | 0 |
| 22 | 609 | 1,597 | 1,070 |

TABLE 4b-continued

| Sample No. | Lapshear Adh. Str. (psi) [@ 250° C. over time (days)] | | |
|---|---|---|---|
| | initial | 1 | 7 |
| 23 | 1,133 | 1,083 | 1,005 |
| 24 | 1,131 | 1,199 | 971 |
| 25 | 1,459 | 1,248 | 1,121 |
| 26 | 1,266 | 1,332 | 1,553 |
| 27 | 946 | 1,043 | 1,032 |
| 28 | 1,060 | 1,189 | 1,279 |
| 29 | 1,233 | 1,771 | 1,658 |
| 30 | 970 | 1,553 | 1,232 |
| 31 | 1,201 | 1,429 | 1,299 |
| 32 | 1,367 | 1,529 | 1,284 |

TABLE 4c

| Sample No. | Lapshear Adh. Str. (psi) [@ 250° C. over time (days)] | | |
|---|---|---|---|
| | initial | 1 | 7 |
| 33 | 926 | 0 | 0 |
| 34 | 954 | 782 | 0 |
| 35 | 1,137 | 1,153 | 0 |
| 36 | 1,041 | 887 | 0 |
| 37 | 1,547 | 1,276 | 1,122 |
| 38 | 1,258 | 1,431 | 1,012 |
| 39 | 1,085 | 1,313 | 1,257 |
| 40 | 946 | 1,043 | 1,032 |
| 41 | 1,569 | 1,661 | 1,502 |
| 42 | 1,060 | 1,189 | 1,279 |
| 43 | 1,442 | 1,281 | 1,381 |

Photoinitiated Formulations

The addition of maleimide-type materials, such as HVA-2, to conventional UV curable (meth)acrylate-based adhesive and sealant compositions for the purpose of improving thermal stability ordinarily inhibits the ability of the composition to cure under exposure to UV radiation. Therefore, while the HVA-2 confers thermal stability ordinarily, it frustrates the curing mechanism of such compositions.

Unlike maleimide-type materials, the addition of imidizole derivatives or latent imidizoles, such as adducts obtained by reacting a compound having an active hydrogen together with a tertiary amino group in the molecule, and epoxy compound and a carboxylic acid anhydride as described in the '155 patent, particularly "AJICURE" PN-23, have been found to not inhibit the ability of such compositions to cure under exposure to UV radiation. And surprisingly such materials show thermal resistance-conferring properties.

A UV curable composition (Sample No. 45) was prepared from ETMPTA (20 phr) as the (meth)acrylate component, ECTA (80 phr) as the coreactant, "DAROCUR" 1173 (4 phr) as a photoinitiator and "AJICURE" PN-23 (10 phr) as a thermal resistance conferring agent. For comparative purposes, two additional compositions were prepared—one without the "AJICURE" PN-23 component (Sample No. 46) and one with HVA-2 (17 phr) instead of the "AJICURE" PN-23 component (Sample No. 47).

In applying these samples onto glass substrates, ASTM 700.10 was followed in the assembly procedure for UV/visible light curing adhesives, and ASTM 714 was followed in measuring the fixture time of UV/visible light curing adhesives, data for the latter of which is shown below in Table 5.

TABLE 5

| Sample No. | Fixture Time (secs) |
| --- | --- |
| 45 | 15 |
| 46 | 15 |
| 47 | >120 |

Figure 9:
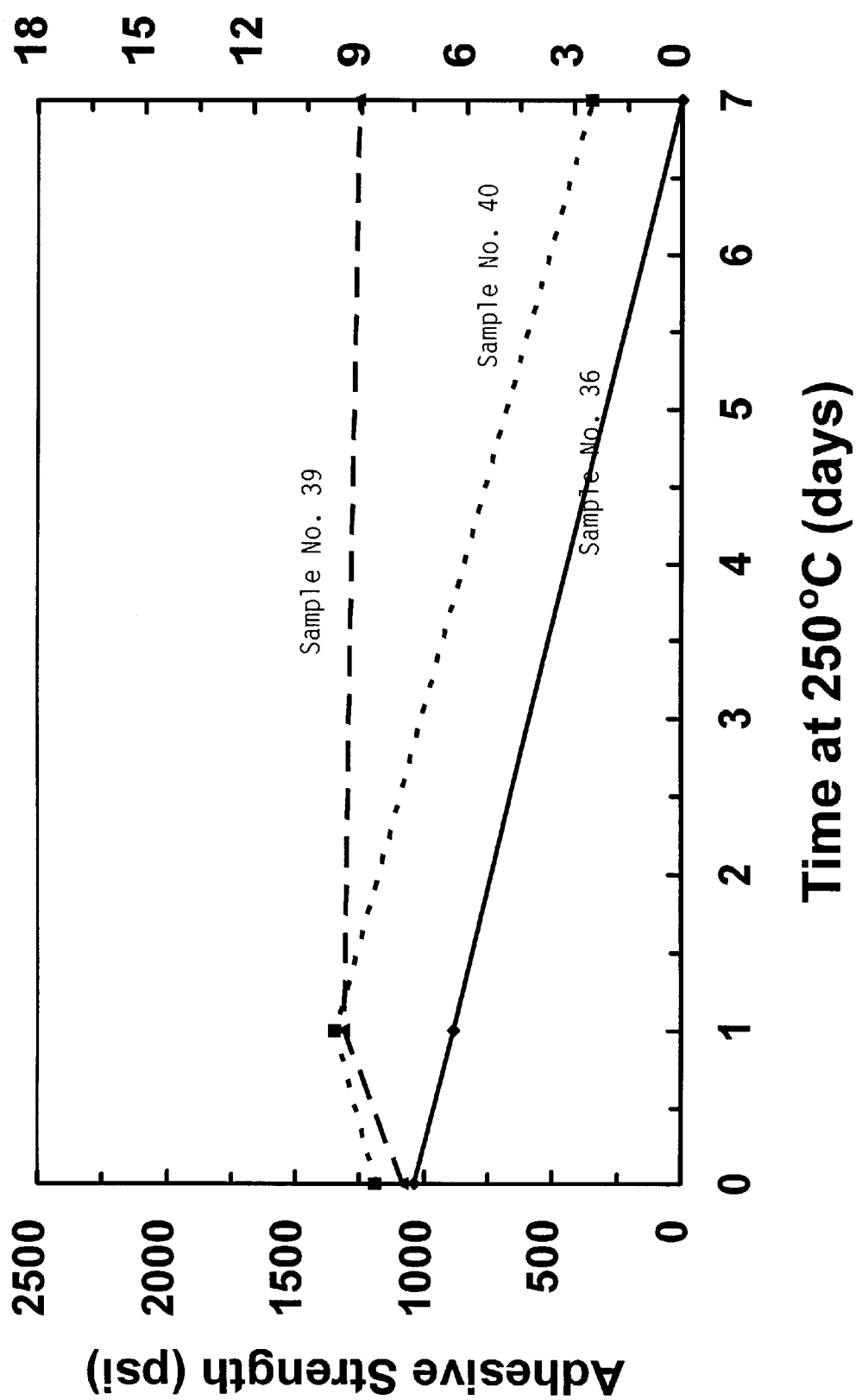
FIG. 9 depicts a plot of adhesive strength over time at a temperature of 250° C. for reaction products of anaerobic adhesives based on CHMA, with "AJICURE" PN-23 (according to the present invention) and the maleimide, HVA-2, as a thermal resistance-conferring agent, and without any such agent.

Reference to FIG. 9 shows the improved resistance to thermal degradation of Sample No. 45 over Sample Nos. 46 (control) and 47 (maleimide).

Figure 10:
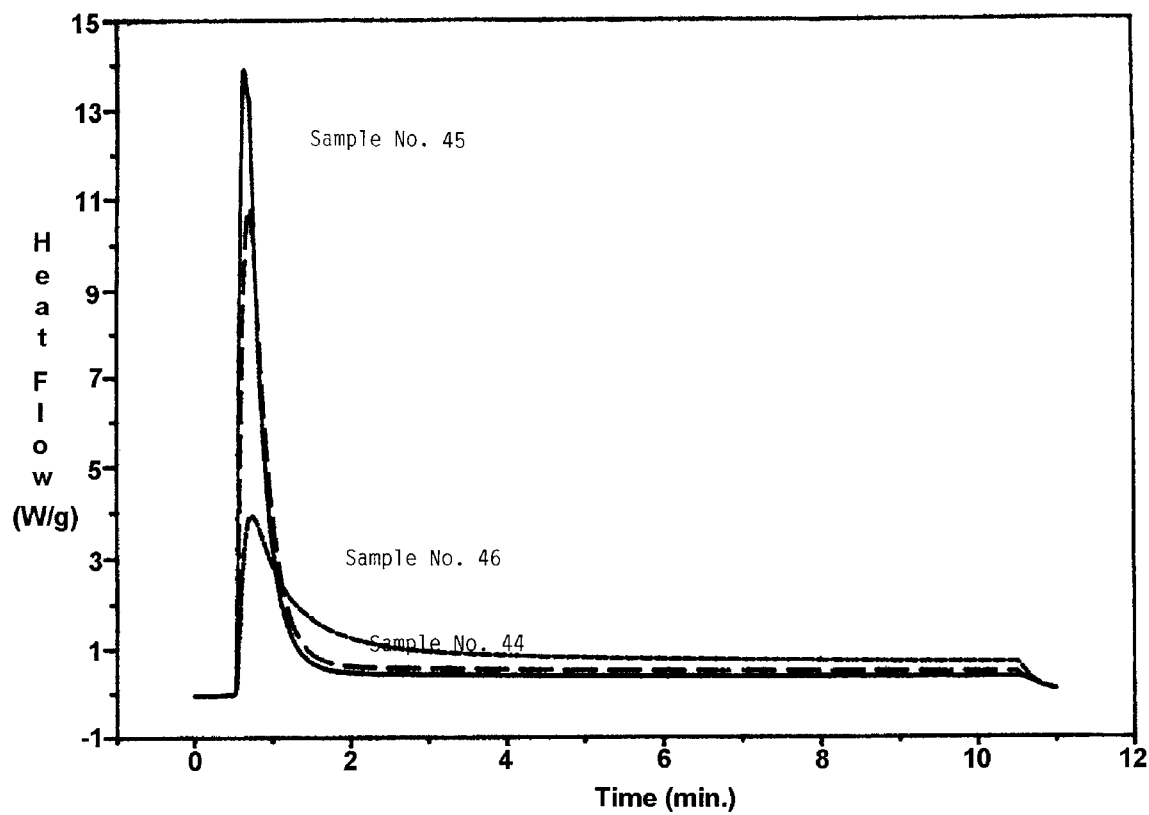
FIG. 10 depicts a plot of heat flow over time for an adhesive based on ETMPTA and the coreactant, ECTA, with and without thermal resistance-conferring agents—the thermal resistance-resistance conferring agents being "AJICURE" PN-23 (according to the present invention) and the maleimide, HVA-2.

Indeed, photodifferential scanning calerimetry ("PDSC"), using a TA Instruments, Model 930 PDSC, demonstrates this remarkable difference in the effects of imidizole derivatives and latent imidizoles as contrasted to maleimide-type materials, when used as thermal stabilizing agents for UV curable adhesive and sealant compositions. See FIG. 10.

The addition of the "AJICURE" PN-23 did not hinder the composition from curing when exposed to UV radiation (e.g., 76 mW/cm²), while allowing the fixture time to remain substantially the same as the control, without the thermal resistance-conferring agent.

These examples are provided solely for illustrative purposes, and are in no way intended to limit the spirit and scope of the invention as defined by the claims.

What is claimed is:

1. A radical curable composition, radical cured reaction products of which demonstrate improved adhesion and resistance to thermal degradation at elevated temperatures, comprising:
    (a) a (meth)acrylate component;
    (b) a coreactant component selected from the group consisting of polymerizable materials within structure I represented as:

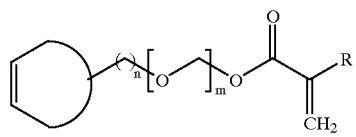

wherein

is a cyclic, bicyclic or tricyclic, carbocyclic or heterocyclic ring structure, which may be substituted or unsubstituted, having from five to eleven ring atoms, R may be chosen from H or alkyl, and n and m may be the same or different and are each integers from 0 to 6; structure II represented as:

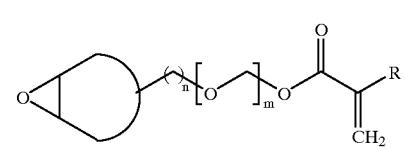

wherein

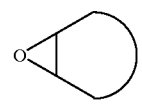

is a cyclic, bicyclic or tricyclic, carbocyclic or heterocyclic ring structure, which may be substituted or unsubstituted, having from five to eleven ring atoms, R may be chosen from H or alkyl, and n and m may be the same or different and are each integers from 0 to 6; and structure III represented as:

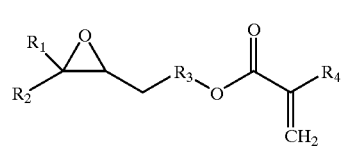

wherein
    $R_1$ may be chosen from H or alkyl;
    $R_2$ may be chosen from H or alkyl; or $R_1$ and $R_2$, taken together, may for, carbo- or hetero-cyclic, bicyclic or tricyclic ring structures having from five to eleven ring atoms; may be chosen from H or alkyl,
    $R_3$ may be chosen from linear or branched alkylene groups, with or without interruption by a hereto atom; and
    $R_4$ is H or alkyl; and
    (c) a radical cure-inducing composition, wherein the presence of the coreactant in the composition provides radical cured reaction products thereof with improved adhesion and resistance to thermal degradation.

2. The composition according to claim 1, further comprising a thermal resistance-conferring agent.

3. The composition according to claim 2, wherein the thermal resistance-conferring agent is a member selected from the group consisting of imidizole derivatives, latent imidizoles, and combinations thereof.

4. The composition according to claim 2, wherein the thermal resistance-conferring agent is an adduct obtained by reacting a compound having an active hydrogen together with a tertiary amino group in the molecule, an epoxy compound and a carboxylic acid anhydride.

5. The composition according to claim 2, wherein the thermal resistance-conferring agent is a member selected from the group consisting of benzoyl imidizole, methyl imidizole, benzoyl methylimidizole, phthaloyl diimidizole and combinations thereof.

6. The composition according to claim 1, wherein the (meth)acrylate component is represented by $H_2C=CGCO_2R_6$, wherein G is a member selected from the group consisting of hydrogen, halogen or alkyl of 1 to about 4 carbon atoms, and $R_6$ is a member selected from the group consisting of alkyl, cycloalkyl, alkenyl, cycloalkenyl, alkaryl, aralkyl and aryl groups having from 1 to about 16 carbon atoms, any of which may be optionally substituted or interrupted with a member selected from the group consisting of silane, silicon, oxygen, halogen, carbonyl, hydroxyl, ester, carboxylic acid, urea, urethane, carbamate, amine, amide, sulfur, sulonate and sulfone.

7. The composition according to claim 1, wherein the (meth)acrylate component is a member selected from the group consisting of polyethylene glycol di(meth)acrylates, citronellyl methacrylate, bisphenol-A di(meth)acrylates, citronellyl acrylate, tetrahydrofurane(meth)acrylates, tetrahydrofurane di(meth)acrylates, hydroxypropyl (meth)acrylate, hexanediol di(meth)acrylate, trimethylol propane tri(meth)acrylate, tetrahydrodicyclopentadienyl (meth)acrylate, ethoxylated trimethylol propane triacrylate, triethylene glycol acrylate, triethylene glycol methacrylate, and an acrylate ester corresponding to

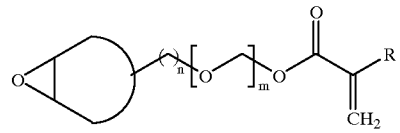

wherein $R_6$ is a member selected from the group consisting of hydrogen, and alkyl and hydroxyalkyl groups having from 1 to about 4 carbon atoms and

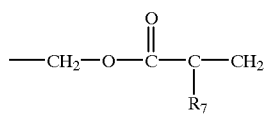

$R^7$ is a member selected from the group consisting of hydrogen, halogen, and alkyl groups having from 1 to about 4 carbon atoms;

$R^8$ is a member selected from the group consisting of hydrogen, hydroxy and

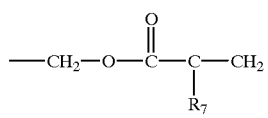

m is an integer equal to at least 1;
n is an integer equal to at least 1; and
v is 0 or 1,
and combinations of the above acrylate components.

8. The composition according to claim 1, wherein the coreactant is a material within structure I:

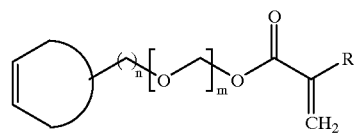

wherein

is a cyclic, bicyclic or tricyclic carbocyclic or heterocyclic ring structure, which may be substituted and unsubstituted, having from five to eleven ring atoms, R may be chosen from H or alkyl, and n and m may be the same or different and are each integers chosen from 0 to 6.

9. The composition according to claim 8, wherein the ring structure may be chosen from cyclopentenyl, cyclohexenyl, 2.1.1-bicyclohexenyl, and 2.2.1-bicycloheptenyl, 3.0.1.2-tricyclodec-1-enyl, wherein n and m are 0 or 1, and R is H or methyl.

10. The composition according to claim 1, wherein the coreactant is a material within structure II:

II

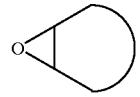

wherein

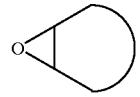

is a cyclic, bicyclic or tricyclic carbocyclic or heterocyclic ring structure, which may be substituted and unsubstituted, having from five to eleven ring atoms, R may be chosen from H or alkyl, and n and m maybe the same or different and are each integers chosen from 0 to 6.

11. The composition according to claim 10, wherein the ring structure may be chosen from cyclopentene oxide, cyclohexene oxide, 2.1.1-bicyclohexene oxide, 2.2.1-bicycloheptene oxide, and 3.0.1.2-tricyclodec-1-ene oxide, wherein n and m are 0 or 1, and R is H or methyl.

12. The composition according to claim 1, wherein the coreactant is a material within structure III:

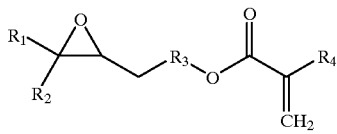

III wherein $R_1$ may be chosen from H or alkyl;

$R_2$ may be chosen from H or alkyl; or $R_1$ and $R_2$, taken together, may form carbo- or hetero-cyclic, bicyclic or tricyclic ring structures having from five to eleven ring atoms;

$R_3$ may be chosen from linear or branched alkylene groups, with or without interruption by a hetero atom; and $R_4$ is H or alkyl.

13. The composition according to claim 1, wherein the coreactant is a member selected from the group consisting of epoxidized citronellyl acrylate; epoxidized citronellyl methacrylate; cyclohexenyl methanol acrylate; cyclohexenyl methanol methacrylate; epoxidized cyclohexenyl methanol methacrylate; dihydrodicyclopentadienyl acrylate; epoxidized dihydrodicyclopentadienyl acrylate; dihydrodicylopentadienyl methacrylate; epoxidized dihydrodicyclopentadienyl methacrylate; epoxidized 2-propenoic acid, 2-[(3a,3,4,5,6,7,7a-hexahydro-4,7-methano-1H-indenyl)oxy]ethyl ester; epoxidized 2-propenoic acid, 2-methyl-, 2-[(3a,3,4,5,6,7,7a-hexahydro-4,7-methano-1H-indenyl)oxy]ethyl ester and combinations thereof.

14. The composition according to claim 1, wherein the radical cure-inducing composition is selected from the group consisting of anaerobic curing-inducing compositions, photoinitiated cure-inducing compositions, thermally-activated cure-inducing compositions, and combinations thereof.

15. The composition according to claim 14, wherein the anaerobic cure-inducing composition comprises saccharin, toluidenes, acetyl phenylhydrazine, and maleic acid.

16. The composition according to claim 15, wherein the thermally-activated composition is a member selected from the group consisting of peroxides, hydroperoxides, 2,4-pentanedione peroxide, di(n-propyl)peroxydicarbonate, di(s-butyl)peroxydicarbonate, di(2-ethylhexyl)peroxydicarbonate, diisononanoyl peroxide, benzoyl peroxide, α-cumylperoxy neodecanoate, 1,1-dimethyl-3-hydroxy-butyl peroxyneoheptanoate, α-cumyl peroxyneoheptanoate, t-amylperoxy neodecanoate, t-butylperoxy neodecanoate, t-butylperoxy neodecanoate, t-amylperoxypivalate, t-butylperoxypivalate, 1,1-dimethyl-3-hydroxy-butylperoxy-2-ethylhexanoate, 2,5-dimethyl-2,5-di(2-ethylhexanoyl peroxy)hexane, t-amylperoxy-2-ethylhexanoate, t-butyl peroctanoate, t-butylperoxy-2-ethylhexanoate, t-butyl peroxyisobutyrate, t-butyl peroxymaleic acid, t-butyl peroxyacetate, t-amyl peroxyacetate, di-t-butyl diperoxyphthalate, OO-t-butyl-O-isopropyl monoperoxycarbonate, 2,5-dimethyl-2,5-di(benzoylperoxy)hexane, OO-t-butyl-O-(2-ethylhexyl) monoperoxycarbonate, OO-t-amyl-O-(2-ethylhexyl) monoperoxycarbonate, dicumyl peroxide, 2,5-dimethyl-2,5-di-(t-butylperoxy)hexane, t-butyl cumyl peroxide, αα-bis(t-butylperoxy)diisopropylbenzene, 2,5-dimethyl-2,5-di-(t-butylperoxy)hexyne-3, 2,5-dihydro-peroxy-2,5-dimethylhexane, n-butyl-4,4-di-(t-butylperoxy)valerate, 1,1-di(t-butylperoxy)-3,3,5-trimethyl cyclohexane, 1,1-di(t-butylperoxy)cyclohexane, 2,2-di(t-butylperoxy)butane, ethyl-3,3-di(t-butylperoxy)butyrate, 2,2-di-(t-amylperoxy) propane, ethyl 3,3-di(t-amylperoxy)butyrate, azobis-isobutyrile nitrile, butane nitrile, 2-methyl, 2,2'-azobis, cyclohexane carbonitrile, 1,1'-azobis and combinations thereof.

17. The compositions according to claim 15, wherein the photoinitiated cure-inducing composition is a member selected from the group consisting of 1-hydroxycyclohexyl phenyl ketone, (2-methyl-1-[4-(methylthio)phenyl]-2-morpholino propan-1-one), 2-benzyl-2-N,N-dimethylamino-1-(4-morpholinophenyl)-1-butanone, 1-hydroxy cyclohexyl phenyl ketone, benzophenone, 2,2-dimethoxy-2-phenyl acetophenone, bis(2,6-dimethoxybenzoyl-2,4-,4-trimethyl pentyl)phosphine oxide, 2-hydroxy-2-methyl-1-phenyl-propan-1-one, 2-hydroxy-2-methyl-1-phenyl-1-propane, 2,4,6-trimethylbenzoyldiphenyl-phosphine oxide, 2-hydroxy 2-methyl-1-phenyl-propan-1-one, mixed triaryl sulfonium hexafluoroantimonate salts, mixed triaryl sulfonium hexafluorophosphate salts, dl-camphorquinone, benzil dimethyl ketal, benzoin butyl ethers, trimethylbenzophenone blend, α-hydroxy ketone, polymeric hydroxy ketone, triphenyl phosphine oxide, 2- and 4-isopropylthioxanthone, ethyl 4-(dimethyl amino)benzoate, diaryl iodonium hexafluoroantimonate, triaryl sulfonium hexafluorophosphate, and combinations thereof.

18. Reaction products formed from the composition according to claim 1, upon exposure to conditions in which air is substantially excluded therefrom under ambient temperature conditions.

19. Reaction products formed from the composition according to claim 1, upon exposure to conditions in which (a) air is substantially excluded therefrom and (b) the temperature conditions are elevated beyond room temperature.

20. Reaction products formed from the composition according to claim 17, upon exposure to UV radiation.

21. A process for preparing a reaction product from the radical-curable adhesive composition according to claim 1, the steps of which include:

applying the composition to a substrate surface and exposing the coated substrate surface to conditions which are appropriate to effect cure thereof.

22. A process for preparing the radical-curable adhesive composition according to claim 1, the step of which includes:

combining with mixing the (meth)acrylate component, the coreactant, optionally the thermal resistance-conferring agent, and the radical cure-inducing composition.

* * * * *

UNITED STATES PATENT AND TRADEMARK OFFICE
CERTIFICATE OF CORRECTION

PATENT NO. : 6,150,479
DATED : November 21, 2000
INVENTOR(S) : Klemarczyk et al.

Page 1 of 1

It is certified that error appears in the above-identified patent and that said Letters Patent is hereby corrected as shown below:

Column 5,
Line 42, delete the formula and replace it with the following:

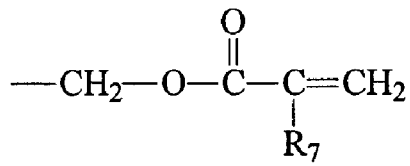

Line 52, delete the formula and replace it with the following:

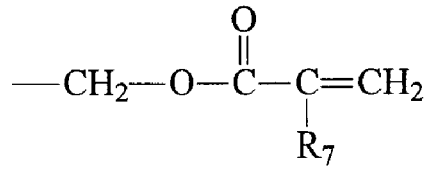

Column 17,
Table 4b, replace the line beginning with "13" with the following:
-- 13        1,013        1,062        100 --

Signed and Sealed this

Tenth Day of September, 2002

Attest:

JAMES E. ROGAN
Attesting Officer    Director of the United States Patent and Trademark Office